US012603509B2

(12) United States Patent
Pmsvvsv et al.

(10) Patent No.: US 12,603,509 B2
(45) Date of Patent: Apr. 14, 2026

(54) MICROGRID WITH AUTOMATIC LOAD SHARING CONTROL DURING OFF-GRID STANDALONE OPERATION

(71) Applicant: BLOOM ENERGY CORPORATION, San Jose, CA (US)

(72) Inventors: Prasad Pmsvvsv, Sunnyvale, CA (US); Beau Baker, Sunnyvale, CA (US); Vignan Reddy Bommireddy, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 931 days.

(21) Appl. No.: 17/660,300

(22) Filed: Apr. 22, 2022

(65) Prior Publication Data

US 2022/0352725 A1     Nov. 3, 2022

Related U.S. Application Data

(60) Provisional application No. 63/181,474, filed on Apr. 29, 2021.

(51) Int. Cl.
    *H02J 3/32*          (2006.01)
    *G05B 19/042*        (2006.01)
    (Continued)

(52) U.S. Cl.
    CPC .............. *H02J 3/46* (2013.01); *G05B 19/042* (2013.01); *H02J 3/32* (2013.01); *H02J 3/381* (2013.01);
    (Continued)

(58) Field of Classification Search
    CPC ...... H02J 3/46; H02J 3/32; H02J 3/381; H02J 2300/24; H02J 2300/28; H02J 2300/30;
    (Continued)

(56) References Cited

U.S. PATENT DOCUMENTS 8,440,362 B2   5/2013   Richards et al.
9,190,693 B2   11/2015  Sridhar et al.
(Continued)

FOREIGN PATENT DOCUMENTS

CN      109643897 A     4/2019
CN      110112741 A     8/2019
(Continued)

OTHER PUBLICATIONS

European Office Communication, European extended search report for EP Application No. 22169452.4, mailed Jan. 20, 2023, 11 pages.
(Continued)

*Primary Examiner* — Christopher E. Everett
(74) *Attorney, Agent, or Firm* — THE MARBURY LAW GROUP PLLC

(57)                ABSTRACT

Various embodiments include methods and systems for managing electric power demand distribution across electric power generators in a microgrid. The system may include electric power generator clusters each having electric power generators, electric power output units each electrically connected to at least one of the electric power generator clusters, an energy storage unit electrically connected to an electric power output unit, and a control device. The control device may be configured to determine whether an energy availability of the energy storage unit is less than an energy availability threshold, calculate a sharing multiplication factor for an electric power generator cluster in response to determining that the energy availability of the energy storage unit is less than an energy availability threshold, and calculate a sharing electric power demand for the electric power generator cluster using the sharing multiplication factor.

20 Claims, 8 Drawing Sheets

(51) Int. Cl.
    *H02J 3/38*         (2006.01)
    *H02J 3/46*         (2006.01)

(52) U.S. Cl.
    CPC ... *G05B 2219/2639* (2013.01); *H02J 2300/24* (2020.01); *H02J 2300/28* (2020.01); *H02J 2300/30* (2020.01)

(58) Field of Classification Search
    CPC .... H02J 7/34; H02J 1/10; H02J 7/0048; H02J 2300/20; G05B 19/042; G05B 2219/2639; Y02E 60/50; Y04S 10/123; Y04S 10/14
    See application file for complete search history.

(56) References Cited

U.S. PATENT DOCUMENTS

| | | | |
|---|---|---|---|
| 11,196,068 B2 | 12/2021 | Weingaertner et al. | |
| 11,258,294 B2 | 2/2022 | Pmsvvsv et al. | |
| 2008/0179959 A1* | 7/2008 | Folken | H02J 3/38 |
| | | | 307/80 |
| 2012/0049638 A1* | 3/2012 | Dorn | H02J 3/42 |
| | | | 307/87 |
| 2014/0009003 A1 | 1/2014 | Ballantine et al. | |
| 2015/0288220 A1 | 10/2015 | Gurunathan et al. | |
| 2016/0036236 A1 | 2/2016 | Teichmann | |
| 2016/0285269 A1* | 9/2016 | Majumder | H02J 3/16 |
| 2016/0359328 A1 | 12/2016 | Hunt et al. | |
| 2017/0005480 A1 | 1/2017 | Ballantine et al. | |
| 2017/0271882 A1* | 9/2017 | Ravikumar | H02J 3/42 |
| 2017/0331325 A1 | 11/2017 | Ristau | |
| 2017/0338502 A1 | 11/2017 | Pmsvvsv et al. | |
| 2019/0052094 A1 | 2/2019 | Pmsvvsv et al. | |
| 2019/0229535 A1 | 7/2019 | Pmsvvsv et al. | |
| 2019/0245216 A1 | 8/2019 | Liao et al. | |
| 2019/0312432 A1 | 10/2019 | Gurunathan et al. | |
| 2019/0312441 A1 | 10/2019 | Ballantine et al. | |
| 2020/0020964 A1 | 1/2020 | Pmsvvsv et al. | |
| 2020/0076200 A1 | 3/2020 | Ballantine et al. | |
| 2020/0212459 A1 | 7/2020 | Ballantine et al. | |
| 2020/0243885 A1 | 7/2020 | Weingaertner et al. | |
| 2020/0266658 A1 | 8/2020 | Cottuli et al. | |
| 2021/0152016 A1 | 5/2021 | Pmsvvsv et al. | |
| 2021/0257638 A1 | 8/2021 | Pmsvvsv et al. | |
| 2021/0267952 A1 | 9/2021 | Holmes et al. | |
| 2021/0328238 A1 | 10/2021 | Cedarleaf-Pavy et al. | |
| 2021/0359540 A1 | 11/2021 | Pmsvvsv et al. | |
| 2021/0359623 A1 | 11/2021 | Pmsvvsv et al. | |

FOREIGN PATENT DOCUMENTS

| | | |
|---|---|---|
| KR | 10-2018-0128849 | 12/2018 |
| TW | 201232993 A | 8/2012 |
| TW | 201603439 A | 1/2016 |
| TW | 201711331 A | 3/2017 |
| WO | WO2017/044196 | 3/2017 |
| WO | WO2018/216899 A1 | 11/2018 |

OTHER PUBLICATIONS

Notification of Transmittal of the International Search Report and the Written Opinion of the International Searching Authority for International Patent Application No. PCTUS2021/018150, mailed on Jun. 9, 2021, 8 pages.

U.S. Appl. No. 17/686,877, filed Mar. 4, 2022, Bloom Energy Corporation.

Office Communication and Search Report from the Intellectual Property Office of Taiwan for ROC (Taiwan) Patent Application No. 111115456, dated Jul. 15, 2025, 5 pages including partial English-language translation of the search report.

* cited by examiner

400

404 ⌐

700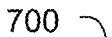

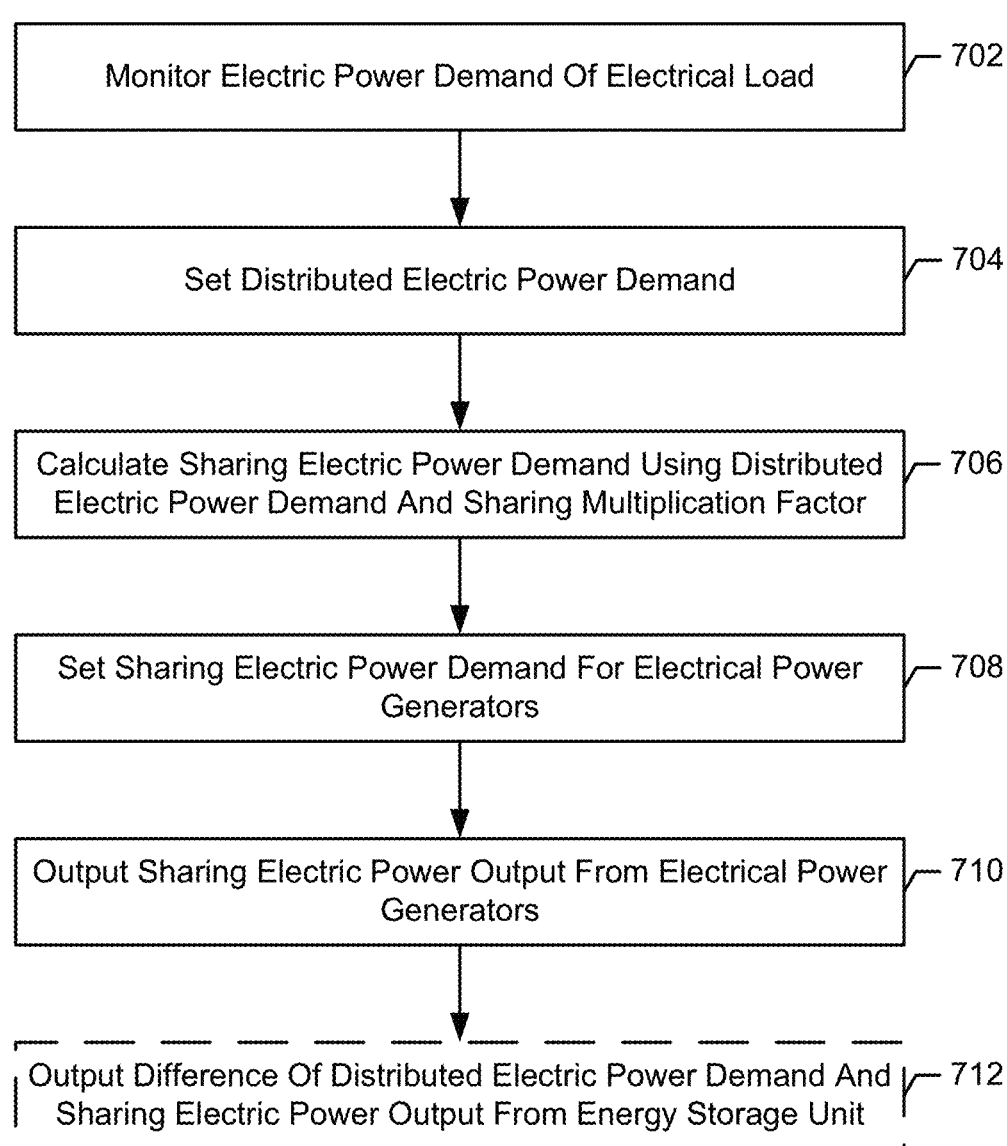

| Monitor Electric Power Demand Of Electrical Load | 702 |

| Set Distributed Electric Power Demand | 704 |

| Calculate Sharing Electric Power Demand Using Distributed Electric Power Demand And Sharing Multiplication Factor | 706 |

| Set Sharing Electric Power Demand For Electrical Power Generators | 708 |

| Output Sharing Electric Power Output From Electrical Power Generators | 710 |

| Output Difference Of Distributed Electric Power Demand And Sharing Electric Power Output From Energy Storage Unit | 712 |

FIG. 7

MICROGRID WITH AUTOMATIC LOAD SHARING CONTROL DURING OFF-GRID STANDALONE OPERATION

FIELD

The present invention is generally directed to power generation systems in general, and to a microgrid that manages power demand distribution across various electric power generators in particular.

BACKGROUND

Electrochemical devices, such as fuel cells, can convert energy stored in fuels to electric energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electric current flow through the circuit.

SOFC systems may be used to power many different loads under many different arrangements. The variety of potential applications creates a need for a SOFC system and control method that can be readily adapted for use with different kinds of loads under different use arrangements.

SUMMARY

Various embodiments may include a microgrid electrically connectable to a load, comprising two or more electric power generator clusters, each having at least one electric power generator, including a first electric power generator cluster having at least a first electric power generator, two or more electric power output units, each electrically connected to a respective one of the two or more electric power generator clusters, including a first electric power output unit electrically connected to the first electric power generator cluster, an energy storage unit electrically connected to the first electric power output unit, and a control device. The control device is configured with control device executable code configured to cause the control device to execute operations comprising determining whether an energy availability of the energy storage unit is less than an energy availability threshold, calculating a first sharing multiplication factor for the first electric power generator cluster in response to determining that the energy availability of the energy storage unit is less than the energy availability threshold, and calculating a sharing electric power demand for the first electric power generator cluster using the first sharing multiplication factor, wherein the sharing electric power demand is less that a distributed electric power demand.

Various embodiments may include a method of managing electric power demand distribution across electric power generators in a microgrid electrically connected to a load, the method comprising determining whether an energy availability of an energy storage unit is less than an energy availability threshold, wherein the energy storage unit is electrically connected to a first electric power output unit of a plurality of electric power output units, calculating a first sharing multiplication factor for a first electric power generator cluster of a plurality of electric power generator clusters in response to determining that the energy availability of the energy storage unit is less than an energy availability threshold, wherein the first electric power generator cluster includes at least a first electric power generator that is electrically connected to the first electric power output unit; and calculating a sharing electric power demand for the first electric power generator cluster using the first sharing multiplication factor, wherein the sharing electric power demand is less that a distributed electric power demand.

Various embodiments may include a microgrid electrically connectable to a load, comprising two or more electric power generator clusters each having at least one fuel cell electric power generator, including a first electric power generator cluster having at least a first fuel cell power generator, two or more electric power output units, each containing an inverter electrically connected to respective one of the two or more electric power generator clusters, including a first electric power output unit electrically connected to the first electric power generator cluster, a battery electrically connected to the first electric power output unit, and a control device. The control device is configured with control device executable code configured to cause the control device to execute operations comprising determining whether an energy availability of the battery is less than an energy availability threshold, calculating a first sharing multiplication factor for the first electric power generator cluster in response to determining that the energy availability of the battery is less than the energy availability threshold, calculating a sharing electric power demand for the first electric power generator cluster using the first sharing multiplication factor, wherein the sharing electric power demand is less that a distributed electric power demand, configuring the first electric power output unit to output an amount of electric power received from the first electric power generator cluster satisfying the sharing electric power demand, and configuring the first electric power output unit to output an amount of electric power received from the battery that is the difference between the distributed electric power demand and the sharing electric power demand in response to determining that the energy availability of the energy storage unit is less than an energy availability threshold.

DESCRIPTION OF THE DRAWINGS

FIG. 7 is a process flow diagram for managing electric power demand distribution across electric power generators in a microgrid according to some embodiments.

DETAILED DESCRIPTION

Figure 1:
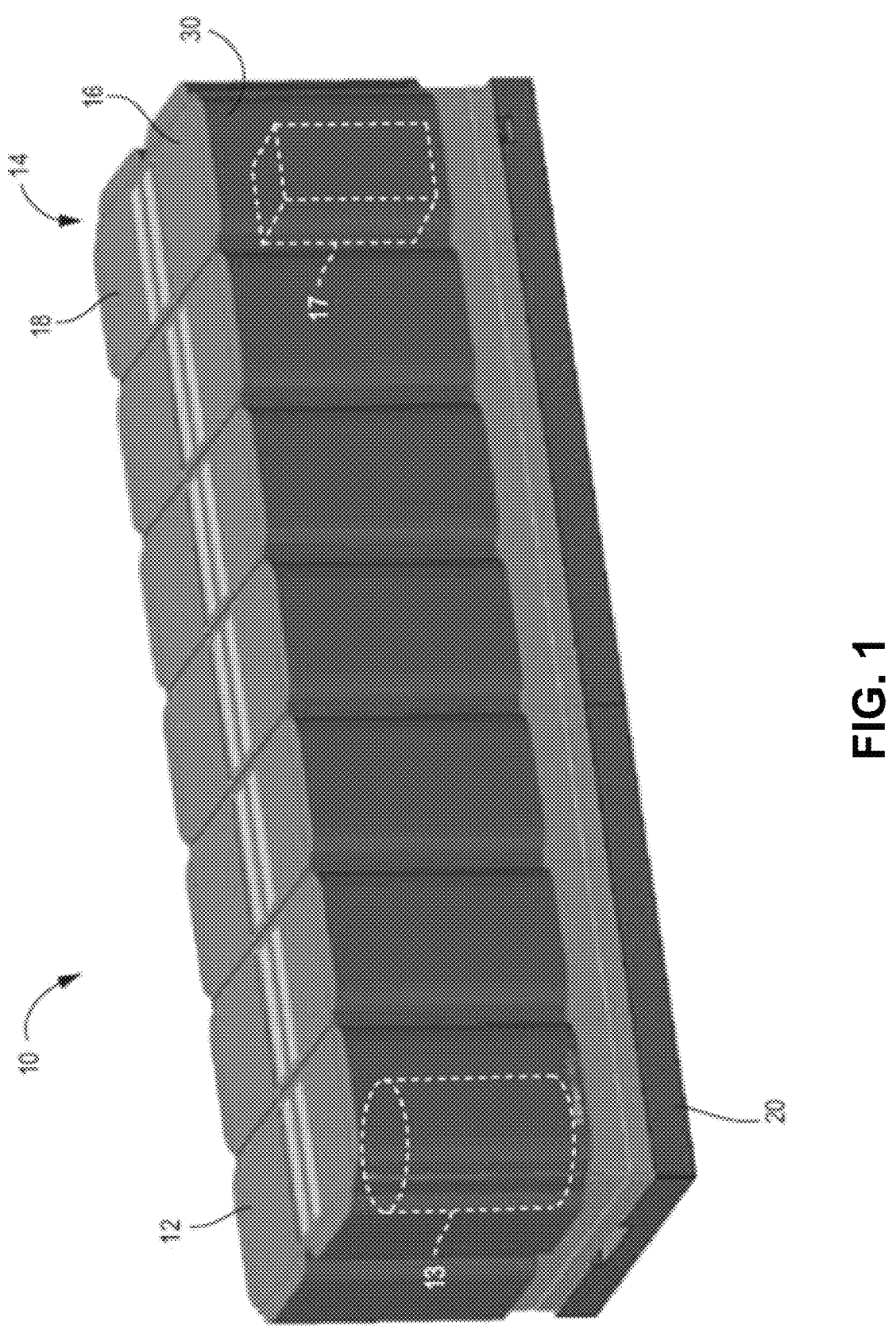
FIG. 1 is a perspective view of a fuel cell system according to various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

As used herein, the terms "electric power generator," "power generator," and "generator" are used interchangeably to refer to a generator capable of generating electric power from any source, such as a fuel cell, a combustion generator, a photovoltaic cell, a concentrated solar system, a wind turbine, a geothermal turbine, a hydroelectric turbine, a gas turbine, a nuclear reactor, an alternator, an induction generator, etc. Examples herein described in terms of fuel cell generators do not limit the scope of the claims and descriptions to such types of generators.

As used herein, the terms "energy storage unit" are used to refer to any form of energy storage that may be converted to electric power, such as electrical storage, mechanical storage, electromechanical storage, electrochemical storage, thermal storage, etc. Examples may include a battery, a capacitor, a supercapacitor, a flywheel, a liquid reservoir, a gas reservoir, etc. Examples herein described in terms of batteries do not limit the scope of the claims and descriptions to such types of energy storage units.

Various embodiments include electrical circuits, electrical components, and methods for managing a microgrid to address electric power demand distribution across multiple electric power generators having unbalanced electric power generation ability (i.e., maximum electric power generation capacity). The unbalanced electric power generators may be configured to provide electric power to electric power output units, which may be configured to output balanced amounts, such as equal amounts, of electric power in response to an electric power demand for each electric power output unit. Electric power generation capacity may be supplemented with energy stored in the respective energy storage unit, which may be used to provide electric power to the electric power output units when an electric power demand exceeds the electric power generation capacity of a given electric power generator. The microgrid may modify output electric power of the electric power generators based on energy availability (e.g., state of charge, etc.) of the energy storage units such that the electric power demand does not exceed the capacity of the electric power generators.

Electric power generators, such as solid oxide fuel cell based generators connected in parallel, equally share the electric power demand of an electrical load, also referred to herein as an electric power demand or a load demand. In a distributed electric power generation (e.g., grid parallel) operation mode, the desired method of microgrid control is to keep the electric power generation levels stable and constant for each electric power generator. However, in standalone electric power generation (e.g., off-grid) operation mode, the electric power generation levels are determined by the nature of the electrical load being powered and are not controllable by the electric power generators.

Existing microgrid systems with electric power generators electrically connected in parallel lack controllers which have knowledge of a desired distribution of the loading across the generators or clusters of generators. When electric power generators are distributed unevenly among the clusters or have different maximum electric power generation capacity, the individual electric power generators or clusters end up being loaded unevenly. In situations that the load demand for each generator or cluster exceeds the electric power generation capacity of the generator or cluster, a conventional microgrid requires an equal load for each generator or cluster. This artificially limits the electric power generation capacity of all other generators or clusters in the microgrid to the electric power generation capacity of the generator or cluster in the microgrid with the lowest power generation capacity.

The embodiments described herein solve the foregoing issues by dynamically adjusting a sharing multiplication factor for each electric power generator or cluster of generators based on amount of energy stored by a respective energy storage unit of a respective power generator or cluster.

Electric power may be drawn from an energy storage unit when an electric power demand on a respective power generator or cluster of generators exceeds the electric power generation capacity of the generator or clusters of generators. This may occur when the microgrid operates in the off-grid, standalone mode of operation where the load and the microgrid are not electrically connected to the power grid. The maximum electric power generation capacity of the generator or cluster of generators may be exceeded by increases in the electric power demand and/or by decreases in the maximum electric power generation capacity due to various health factors of the generators.

When the electric power demand on the respective power generator or cluster of generators exceeds the electric power generation capacity of the generator or clusters of generator, stored energy (i.e., electric power) is drawn from the respective energy storage unit which is associated with the respective power generator or cluster of generators. Electric power drawn from the energy storage unit reduces the amount of energy stored in the energy storage unit below a certain threshold value (e.g., the state of charge of a battery, capacitor or supercapacitor is decreased below 100%). In one embodiment, the reduction of the storage energy below the threshold value triggers a modification (e.g., recalculation) of a sharing multiplication factor for different generators or clusters of generators that supply electric power to a common load.

The sharing multiplication factor may be dynamically recalculated as a function of stored energy remaining or expended (e.g., state of charge) of the energy storage unit and/or may be set to a fixed value if the stored energy remaining or expended (e.g., state of charge) of the energy storage reaches a certain cut off value (e.g., the state of charge reaching a value in a range of 20 to 90% for example). The sharing multiplication factor may be used, for example, to operate the generator or cluster of generators which have the lowest maximum electric power generation capacity in the microgrid at their maximum electric power generation capacity, and to operate other generator(s) or cluster(s) of generators at a higher electric power output to still meet the load demand. If possible, the microgrid may operate to recharge the energy storage units to their full storage capacity (i.e., to 100% state of charge) after the load demand decreases.

The embodiments described herein may individually control the electric power outputs of electric power generators or clusters thereof in a microgrid. By relying on the stored energy availability of the respective energy storage units, the embodiments described herein may dynamically respond to changes in the health states of the electric power generators or clusters thereof, or any other electric power generation capacity altering state, without requiring any knowledge of the actual states of health of the electric power generators or clusters thereof. Further, individual control of the electric power outputs of the cluster of electric power generators may allow for increased utilization of the electric power generation capacity of the electric power generation micro-grid system by avoiding artificial limits on the electric power generation capacity of all electric power generators or clusters thereof in the microgrid based on the maximum electric power generation capacity of a generator or cluster of generators which have the lowest maximum electric power generation capacity in the microgrid.

FIG. 1 illustrates an example of one electrical power generator which comprises modular fuel cell system that is more fully described in U.S. Pat. No. 8,440,362, incorporated herein by reference for descriptions of the modular fuel cell system. The modular system may contain modules and components described above as well as in U.S. Pat. No. 9,190,693, which is incorporated herein by reference for descriptions of the modular fuel cell system. The modular design of the fuel cell system enclosure 10 provides flexible system installation and operation.

The modular fuel cell system enclosure 10 includes a plurality of power module housings 12 (containing a fuel cell power module components), one or more fuel input (i.e., fuel processing) module housings 16, and one or more power conditioning (i.e., electrical output) module housings 18. For example, the system enclosure may include any desired number of modules, such as 2-30 power modules, for example 6-12 power modules. FIG. 1 illustrates a system enclosure 10 containing six power modules (one row of six modules stacked side to side), one fuel processing module, and one power conditioning module, on a common base 20. Each module may comprise its own cabinet or housing. Alternatively, the power conditioning and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power, electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in an example embodiment in FIG. 1, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may include more than one row of modules 12. For example, as noted above, the system may include two rows of power modules stacked back to back.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door 30 to module 14 may be on the side rather than on the front of the cabinet.

Figure 2:
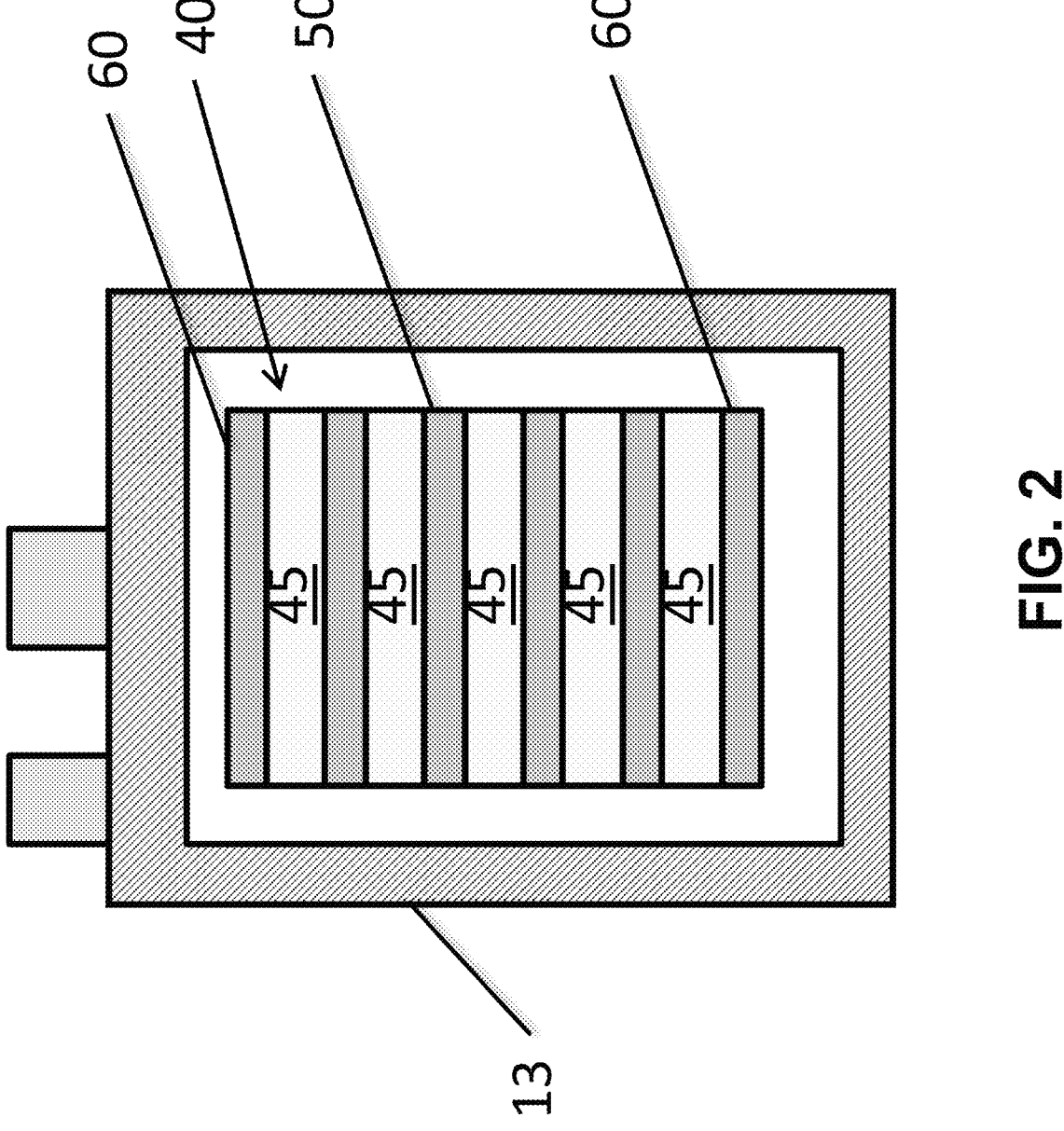
FIG. 2 is a schematic side cross-sectional view of a hot box according to various embodiments.

FIG. 2 illustrates a plan view of a fuel cell system hotbox 13 including a fuel cell stack or column 40. The hotbox 13 is shown to include the fuel cell stack or column 40. However, the hotbox 13 may include two or more of the stacks or columns 40. The stack or column 40 may include the electrically connected fuel cells 45 stacked on one another, with the interconnects 50 disposed between the fuel cells 45. The first and last fuel cells 45 in the stack or column are disposed between a respective end plate 60 and interconnect 50. The end plates 60 are electrically connected to electrical outputs of the fuel cell stack or column 40. The hotbox 13 may include other components, such as fuel conduits, air conduits, seals, electrical contacts, etc., and may be incorporated into a fuel cell system including balance of plant components. The fuel cells 45 may be solid oxide fuel cells containing a ceramic electrolyte, such as yttria stabilized zirconia (YSZ) or scandia stabilized zirconia (SSZ), an anode electrode, such as a nickel-YSZ, a Ni-SSZ or a nickel-samaria doped ceria (SDC) cermet, and a cathode electrode, such as lanthanum strontium manganite (LSM)). The interconnects 50 and/or end plates 60 may comprise any suitable gas impermeable and electrically conductive material, such as a chromium-iron alloy, such as an alloy containing 4 to 6 wt % iron and balance chromium. The interconnects 50 electrically connect adjacent fuel cells 45 and provide channels for fuel and air to reach the fuel cells 45.

Fuel cell systems, such as modular fuel cell system enclosure 10, may include and/or be augmented by various pieces of support equipment. Support equipment may include various auxiliary equipment and systems to support the operation of the fuel cell system. Support equipment may vary based on constraints and/or features at a site where the fuel cell system is installed. As non-limiting examples, support equipment may include, fuel support equipment, air support equipment, and/or ventilation support equipment. One type of fuel support equipment may include equipment configured to control supply and/or exhaust fuel pressure in the fuel cell system, such as a fuel blower or pump to supply fuel to, recycle fuel/exhaust in, and/or exhaust fuel from the fuel cell system. Another type of fuel support equipment may be configured to process fuel for the fuel cell system, such as a fuel pre-heater, exhaust scrubber, etc. Other types of fuel support equipment may also be used. One type of air support equipment may be air supply equipment configured to provide air into the fuel cell system and/or exhaust air from the fuel cell system, such as blowers or fans to provide air to and/or exhaust air from a fuel cell cathode, an anode tail gas oxidizer (ATO), an air heat exchanger, a CPOx reactor, etc. Other types of air support equipment may also be used. One type of ventilation support equipment may include equipment configured to ventilate from and/or circulate air in portions of housings external of the hot box (e.g., portions within modular fuel cell system enclosure 10 but external of the hot box 13 itself), such as a ventilation fan to blow air from within the enclosure 10 out of the enclosure 10 to maintain an acceptable enclosure 10 pressure. Other types of ventilation support equipment may also be used.

Figure 3A:
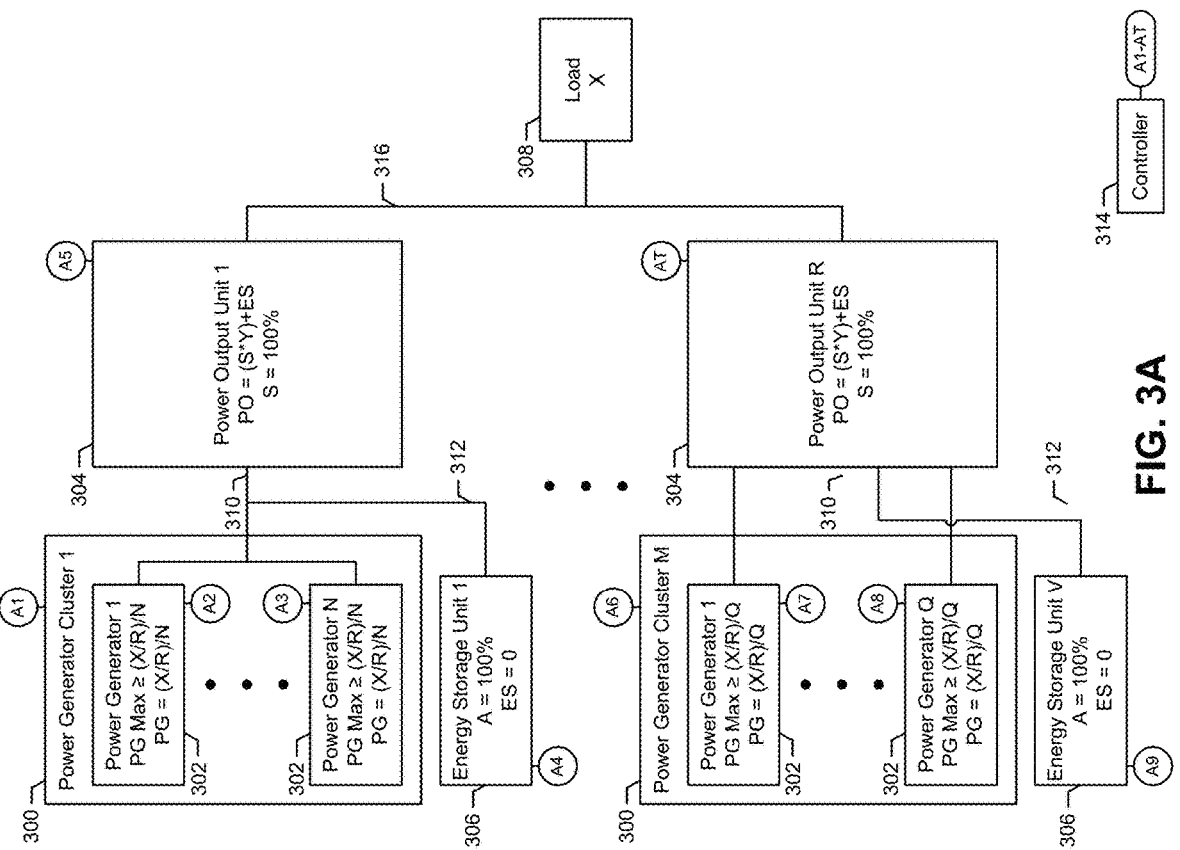
FIGS. 3A and 3B are block diagrams of a microgrid managing electric power distribution across electric power generators according to some embodiments.
Figure 3B:
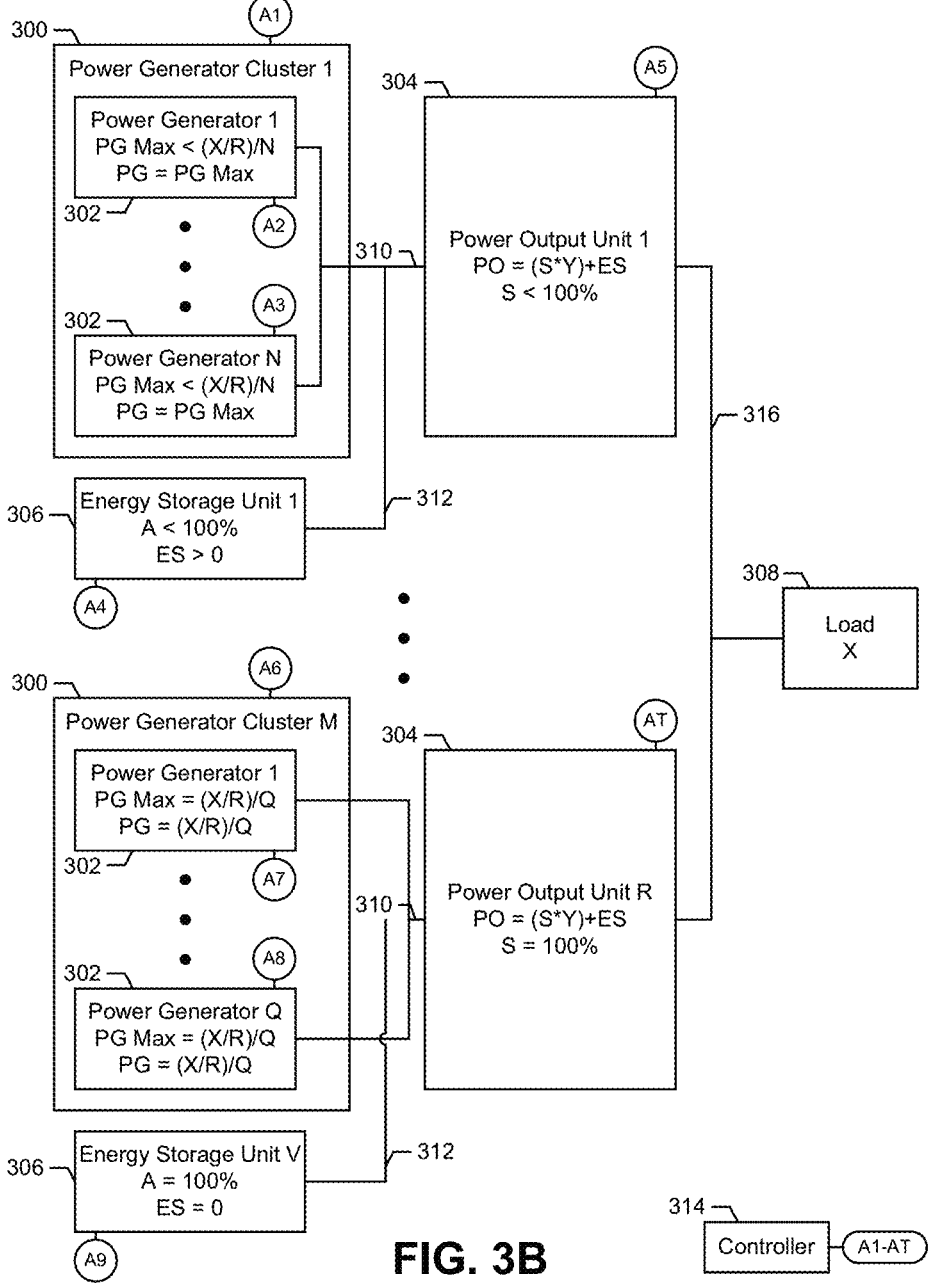

FIGS. 3A and 3B illustrate different embodiments of a microgrid configured to manage electric power demand distribution across different electric power generators or clusters thereof. A microgrid may include a variety of components, including any number and combination of electric power generator clusters 300, electric power generators 302, electric power output units 304, energy storage units 306, electric power generator busses 310, energy storage unit busses 312, and electrical load busses 316.

Each electric power generator cluster 300 may include one or more electric power generators 302. The electric power generator 302 may include a fuel cell module or system, a combustion generator, a photovoltaic cell, a concentrated solar system, a wind turbine, a geothermal turbine, a hydroelectric turbine, a gas turbine, a nuclear reactor, an alternator, or an induction generator. In one embodiment, the electric power generator 302 may comprise one fuel cell power module 12 described above with respect to FIG. 1. In this embodiment, the electric power generator cluster 300 comprises all fuel cell power generator modules 12 of one system enclosure 10. All power generator modules 12 of one system enclosure 10 are electrically connected using a DC bus 310 to the same electric power output unit 304 containing an inverter. In another embodiment, the electric power generator 302 may comprise all power modules 12 in one system enclosure 10. In this embodiment, the electric power generator cluster 300 comprises two or more system enclosures 10 which are electrically connected using DC bus 310 to the same electric power output unit 304 containing an inverter.

The energy storage unit 306 may comprise at least one battery, capacitor, supercapacitor, flywheel, liquid reservoir, or gas reservoir. In one embodiment, the energy storage unit 306 comprises a battery bank, a capacitor bank, or a supercapacitor bank. Each electric power output unit 304 is electrically connected to a respective cluster 300 and to at least one respective energy storage unit 306. Each respective energy storage unit 306 may by physically located inside the respective cluster 300 or outside the respective cluster 300, as long as the energy storage unit 306 and the respective cluster 300 are electrically connected to the same power output unit 304. For a fuel cell electric power generator 302 shown in FIG. 1, the energy storage unit 306 may be located inside the same system enclosure 10 as the power modules 12 or it may be located outside the system enclosure 10.

The electric power output unit 304 may be configured as and/or to include a DC/AC inverter, an AC/DC rectifier, a DC/DC converter, and/or an AC/AC transformer. For example, the electric power output unit 304 may be an uninterruptible power module configured as and/or to include a DC/AC inverter and configured to invert a DC electric power received from an electric power generator cluster 300 and/or from the energy storage unit 306 to an AC electric power. The electric power output unit 304 may be unidirectional and configured to receive DC electric power from the electric power generator cluster 300 at an input end and to supply AC electric power to the load 308 at an output end. The electric power output unit 304 may be electrically connected to a respective electric power generator cluster 300 and to a respective energy storage unit 306 via a respective electric power generator bus 310, and electrically connectable to the electrical load 308 via the electrical load bus 316.

Each electric power generator bus 310 may be configured as a common electrical conduit for one or more electric power generator clusters 300 and an electric power output unit 304. The electric power generator bus 310 may be DC bus configured to transmit DC electric power between an electric power generator cluster 300 and the electric power output unit 304.

Each energy storage unit bus 312 may be a DC bus configured to transmit DC electric power between the energy storage unit 306 and the electric power generator bus 310. Alternatively, the energy storage unit bus 312 may be directly connected to the electric power output unit 304 instead of to the electric power generator bus 310.

The electrical load bus 316 may be configured as a common electrical conduit for the electric power output units 304. The electrical load bus 316 may be an AC bus configured to transmit electric power between the electric power output units 304 and the electrical load 308. The electrical load bus 316 may electrically connect the output end of each of the electric power output units 304 and the electrical load 308.

The load 308 may comprise any suitable electrical load, such as one or more buildings, one or more factories, one or more data centers, one or more pieces of electrical equipment, etc. The maximum electric power generation capacity of all electric power generators 302 of a single electric power generator cluster 300 may be insufficient to generate sufficient electric power to satisfy at least normal electric power demand of the electrical load 308. However, the number of electric power generators 302 located in two or more electric power generator clusters 300 of the microgrid should be sufficient to generate sufficient electric power to satisfy at least normal electric power demand of the electrical load 308.

At any given time, the load 308 generates a total electric power demand on all electric power output units 304 of the microgrid, which is distributed among the electric power output units 304 of the microgrid that are electrically connected to the electrical load 308. As used herein a "distributed electric power demand" may be an equal distribution (i.e., portion) of electric power needed to satisfy the electric power demand of the electrical load 308 for each electrical power output unit 304 and its associated (i.e., electrically connected) electric power generator cluster 300 and/or energy storage unit 306. In some embodiments, the distributed electric power demand may be the electric power demand of the electrical load 308 divided by a number of electric power output units 304 and/or associated clusters 300, such as during normal operation of the electric power generator clusters 300 described further herein. For example, if there are two electric power output units 304 and associated clusters 300 in the microgrid, then the distributed electric power demand on each output unit 304 is one half of the total electric power demand of the load 308. In some embodiments, the distributed electric power demand may be greater than the electric power demand of the electrical load 308 to account for deficiencies in providing electric power from at least one electric power output unit 304 and/or associated cluster 300, such as during abnormal operation of the electric power generator clusters 300 described further herein.

The controller 314 then determines the sharing electric power demand using the distributed electric power demand and a sharing multiplication factor. Specifically, the sharing electric power demand may be a product of the distributed electric power demand and the sharing multiplication factor, as will be discussed in more detail below. Each cluster 300 receives the sharing electric power demand, and in response outputs an amount of electric power (e.g., current) that satisfies the sharing electric power demand. In one embodiment, if no power is drawn from the energy storage units 306, then the sum of all sharing electric power demands (and thus the sum output electric power of all clusters 300 of the microgrid) equals to the total electric power demand of the load 308.

In various embodiments, the number of electric power generators 302 may include any number of redundant electric power generators 302 so that in case of reduced or no electrical output from at least one electric power generator 302, a redundant electric power generator 302 may be used to continue supply of the electric power demand of the electrical load 308. In some embodiments, the microgrid may include any number and combination of electric power generator clusters 300, electric power generators 302 and/or energy storage units 306. The electric power output unit 304 may be electrically connected at the input end to a respective cluster 300 and energy storage unit 306 via the electric power generator bus 310 and/or the energy storage unit bus 312.

For example, the microgrid may include any number "M" of electric power generator clusters 300, where M is a positive integer greater than 1, such as 2 to 20, e.g., 2 to 6. Each electric power generator cluster 300 may include any number of electric power generators 302. In some embodiments, at least one of the electric power generator clusters

300 may include any number "N" of electric power generators 302 and at least another one of the electric power generator clusters 300 may include any number "Q" of electric power generators 302, where N and Q are positive integers, such as 1 to 12, e.g., 5 to 8. In one embodiment, N and Q are not equal. In another embodiment, N and Q are equal, but N generators 302 in one cluster 300 have a different maximum electric power generation capacity than the Q generators in the other cluster 300. Thus, the number of electric power generators 302 and/or their maximum electric power generation capacity in each electric power generator cluster 300 may vary between the various electric power generator clusters 300.

The microgrid may include any number "R" of electric power output units 304, each electrically connected between a respective cluster 300 and the electrical load 308. In some embodiments, a microgrid may include a one-to-one ratio of more electric power generator clusters 300 to electric power output units 304, such that R=M.

The microgrid may include any number "V" of energy storage units 306, where V is a positive integer, such as 2 to 20, e.g., 3 to 6. In some embodiments, the microgrid may include at least one energy storage unit 306 per electric power generator cluster 300 and/or per power output unit 304, such that V is greater than or equal to M.

The microgrid may include any number of control devices (herein also referred to as controllers) 314 configured to receive data signals from and send control signals to any number and combination of the components of the microgrid via any number "T" of wired and/or wireless connections A1 to AT. The control device(s) 314 may be any form of programmable computing device or system, such as a server or system control device, which may be configured to perform operations of various embodiments, including operations of the methods 600, 700 described herein with reference to FIGS. 6 and 7. The microgrid may be electrically connectable to an electrical load 308 configured to operate using electric power provided by the microgrid. Each electric power output unit 304 may be configured to provide the same amount of electric power to the electrical load 308 via an electrical load bus 316.

In some embodiments, the controller 314 may be a central controller 314 configured to communicatively connect to any number and combination of components of the microgrid. In some embodiments, the controller 314 may be multiple dispersed controllers 314 configured to communicatively connect to any number and combination of components of the microgrid. In some embodiments, the controller 314 may be a standalone controller of the microgrid. In some embodiments, the controller 314 may be an integrated controller of any number and combination of components of the microgrid. Any number and combination of the forgoing configurations of the controller 314 may be implemented in the microgrid.

The controller 314 may directly measure and/or interpret received signals as an energy availability of an energy storage unit 306. For example, the controller 314 may directly measure at and/or interpret received signals from the energy storage unit 306, the electric power generator bus 310, the energy storage unit bus 312, and/or the electric power output unit 304. The controller 314 may determine the energy availability of the energy storage unit 306 from the measurements and/or interpretation of the received signals. Energy availability may be determined based on one or more parameters, such as a state of charge or impedance (e.g., for a battery, capacitor or supercapacitor), frequency, velocity (e.g., for a flywheel), or temperature, volume, or pressure (e.g., for gas or liquid storage) of the energy storage unit 306. The term energy availability includes the amount of stored energy left in the energy storage unit 306. The state of charge may be measure of charge remaining or charge that was drawn (i.e., 100% minus percent charge remaining).

The controller 314 may further determine whether the energy availability of the energy storage unit 306 is less than an energy availability threshold value. In some embodiments, the energy availability threshold may be and/or may be approximately 100% of the energy storage capacity of the energy storage unit 306. The controller 314 may compare the energy availability of the energy storage unit 306 with the energy availability threshold to determine whether the energy availability falls short of the energy availability threshold. For example, if the energy availability drops below 100% of the energy storage capacity of the energy storage unit 306, then the controller determines that power was drawn from the energy storage unit 306 and energy availability threshold falls short of the energy availability threshold. Alternatively, the energy availability threshold may be less than 100%, such as 20% to 90%, for example 50% to 80% of the energy storage capacity of the energy storage unit 306.

In response to determining that the energy availability of the energy storage unit 306 falls short the energy availability threshold, the controller 314 may signal and/or control a respective electric power output unit 304 to modify the distributed electric power demand by modifying and applying a sharing multiplication factor to reduce a sharing electric power demand for the electric power generator cluster 300 of the electric power output unit 304 which had to rely on drawing electrical power from its associated energy storage unit 306.

In some embodiments, in response to determining that the energy availability of the energy storage unit 306 falls short the energy availability threshold, the controller 314 may additionally signal and/or control a respective electric power output unit 304 to modify the distributed electric power demand by increasing the distributed electric power to account for deficiencies in providing electric power from the electric power generator cluster 300 of the electric power output unit 304 which had to rely on drawing electrical power from its associated energy storage unit 306.

The sharing electric power demand may be a portion (i.e., fraction) of the distributed electric power demand, or may equal the distributed electric power demand. In response to determining that the energy availability of the energy storage unit 306 does not fall short the energy availability threshold, the controller 314 may signal and/or control a respective electric power output unit 304 to provide the distributed electric power demand to the associated electric power generator cluster 300. Alternatively, the energy availability of the energy storage unit 306 may fall short the energy availability threshold under abnormal operation of the electric power generator cluster 300 as the energy storage unit 306 may output electric power to supplement the amount of electric power needed to satisfy the distributed electric power demand that the electric power generator cluster 300 may not be able to supply. The controller 314 may signal and/or control the electric power output unit 304 to provide the sharing electric power demand to the associated electric power generator cluster 300 while the energy availability of the associated energy storage unit 306 remains below the energy availability threshold. The controller 314 may determine and dynamically adjust over time the sharing multiplication factor based on the energy availability of the energy storage unit 306.

The control of an electric power output unit 304 may enable the electric power output unit 304 to provide sufficient electric power to satisfy the sharing electric power demand, which may be a portion or all of the same distributed electric power demand for each electric power output unit 304 in the microgrid. The control may enable a full utilization or at least a higher utilization of the electric power generation capacity of all electric power generator clusters 300 of the microgrid. The full or higher utilization may be provided by avoiding artificial limits on a higher electric power generation capacity of one electric power generator cluster 300 of the microgrid by another electric power generator cluster 300 in the same microgrid which has a lower electric power generation capacity.

The examples illustrated in FIGS. 3A and 3B are described for illustrative purposes and are not meant to limit the scope of the claims and disclosures made herein. These examples are described herein in terms of two electric power generator clusters 300 (a first electric power generator cluster 300, e.g., power generator cluster 1 in FIGS. 3A and 3B, and a second electric power generator cluster 300, e.g., power generator cluster M in FIGS. 3A and 3B) and their respective electric power generator busses 310 (a first electric power generator bus 310 and a second electric power generator 310), two associated energy storage units 306 (a first energy storage unit 306, e.g., energy storage unit 1 in FIGS. 3A and 3B, and a second energy storage unit 306, e.g., energy storage unit V in FIGS. 3A and 3B) and their respective energy storage unit busses 312 (a first energy storage unit bus 312 and a second energy storage unit bus 312), and two electric power output units 304 (a first electric power output unit 304, e.g., power output unit 1 in FIGS. 3A and 3B that is electrically connected to cluster 1 via the first DC bus 310, and a second electric power output unit 304, e.g., power output unit R in FIGS. 3A and 3B that is electrically connected to cluster M via the second DC bus 310). However, it is conceived that the examples illustrated and described herein are applicable to any number greater than two electric power generator clusters 300 and their respective electric power generator busses 310, energy storage units 306 and their respective energy storage unit busses 312, and/or electric power output units 304.

The microgrid may include at least a first electric power output unit 304 and at least a second electric power output unit 304, each electrically connectable at an output end to the load 308 via the electrical load bus (e.g., AC bus) 316. The first electric power output unit 304 may be electrically connected at an input end to at least a first electric power generator cluster 300 via at least a first electric power generator bus (e.g., DC bus) 310 and to at least a first energy storage unit 306 via at least a first energy storage unit bus 312. The second electric power output unit 304 may be electrically connected at an input end to at least a second electric power generator cluster 300 via at least a second electric power generator bus (e.g., DC bus) 310 and to at least a second energy storage unit 306 via at least a second energy storage unit bus 312. The first electric power generator cluster 300 may include a first number electric power generators 302, represented as "N" in FIGS. 3A and 3B, and the second electric power generator cluster 300 may include a second number electric power generators 302, represented as "Q" in FIGS. 3A and 3B. For the purposes of example and explanation, N may be less than Q. However, in an alternative embodiment N may be equal to Q and the maximum electric power capacity of the N generators may be different from the maximum electric power capacity of the Q generators.

The electrical load 308 may have a total electric power demand, represented as "X" in FIGS. 3A and 3B. The X electric power demand may indicate to the one or more controllers 314 of the microgrid the total amount of electric power the electrical load 308 requires from the microgrid.

The controllers 314 may use the X electric power demand to determine the distributed electric power demand, represented as "Y" in FIGS. 3A and 3B, for the electric power generators 302 of each electric power output unit 304. For example, the Y distributed electric power demand may be determined by dividing the X electric power demand by the number of electric power output units 304, represented as "R" in FIGS. 3A and 3B. Under normal operation of the electric power generator clusters 300, electric power output units 304 may be configured such that the electric power outputs of each electric power output unit 304, represented as "PO" in FIGS. 3A and 3B, are equal to each other and the Y distributed electric power demand.

Each of the electric power generators 302 may have an electric power generator output represented by "PG" in FIGS. 3A and 3B, and a maximum electric power generation capacity, represented as "PG Max" in FIGS. 3A and 3B, of an equal or approximately equal amount. As noted above, in an alternative embodiment, PG Max of the electric power generators may be unequal. Each of the energy storage units 306 may have an energy availability, represented by "A" in FIGS. 3A and 3B, and an energy storage unit output, represented by "ES" in FIGS. 3A and 3B.

Using the A energy availability of an energy storage unit 306, the controllers 314 may determine a sharing multiplication factor, represented as "S" in FIGS. 3A and 3B, for a respective electric power output unit 304. Thus, the controllers 314 may determine the S sharing multiplication factor for the first electric power output unit 304 using the A energy availability of the first energy storage unit 306. The controllers 314 may determine the S sharing multiplication factor for the second electric power output unit 304 using the A energy availability of the second energy storage unit 306.

The controllers 314 may use the S sharing multiplication factor to determine a sharing electric power demand for the electric power generator cluster 300 of a respective electric power output unit 304 by multiplying the S sharing multiplication factor and the Y distributed electric power demand. The S sharing multiplication factor may be such that the sharing electric power demand is equal to the Y distributed electric power demand when the A energy availability is greater than or equal to the energy availability threshold, under normal operation of the electric power generator clusters 300. Alternatively, the S sharing multiplication factor may be such that the sharing electric power demand is less than the Y distributed electric power demand when the A energy availability is less than the energy availability threshold, under abnormal operation of at least one electric power generator cluster 300. In such instances, the PO electric power output of the respective electric power output unit 304 may be the sharing electric power demand combined with the ES energy storage unit output of a respective energy storage unit 306 without limiting the electric power output of the other cluster(s) 300 which are electrically connected to the other electric output units 304 in the microgrid.

For the electric power generator clusters 300 when at least one cluster 300 is under abnormal operation, the controllers 314 may continually and/or repeatedly calculate the Y distributed electric power demand, which may change over time. The controllers 314 may continually and/or repeatedly increase the Y distributed electric power demand and decrease the S sharing multiplication factor for each electric power generator cluster 300 under abnormal operation until the clusters 300 can support the X electric power demand without support of the energy storage units 306. For example, the clusters 300 can support the X electric power demand without support of the energy storage units 306 when the an electric power generator cluster 300 under abnormal operation supports the sharing electric power demand for the cluster 300 without support of its associated energy storage unit 306 and an electric power generator cluster 300 under normal operation supports the Y distributed electric power demand. The sharing electric power demand and the Y distributed electric power demand may combine to support the X electric power demand. At such a point, the A energy availability of the energy storage unit 306 may equalize.

FIG. 3A illustrates an example of the microgrid managing power demand distribution across the electric power generators 302 under normal operation of the electric power generator clusters 300. The electric power output units 304 may be controlled and/or signaled by the controllers 314 to provide PO electric power outputs equal to a respective sharing electric power demand. The controllers 314 may determine the sharing electric power demand for the electric power generators 302 of each electric power generator cluster 300 to be equal to the Y distributed electric power demand and to the other sharing electric power demands for all electric power generator clusters 300 under normal operation.

As described herein, under normal operation of the electric power generator clusters 300, the electric power generators 302 of an electric power generator cluster 300 may provide sufficient PG electric power generator output to satisfy the Y distributed electric power demand. As such, the PG MAX maximum electric power generation capacity of any of the electric power generators 302 may be greater than or equal to the Y distributed electric power demand divided by the number of electric power generators 302 in the electric power generator cluster 300. The PG electric power generator output of any of the electric power generators 302 may be controlled and/or signaled by the controllers 314 to be the Y distributed electric power demand divided by the number of electric power generators 302 in the respective electric power generator cluster 300. The PG electric power generator output of any of the electric power generators 302 of the first electric power generator cluster 300 may be the Y distributed electric power demand divided by the N electric power generators 302. The PG electric power generator output of any of the electric power generators 302 of the second electric power generator cluster 300 may be the Y distributed electric power demand divided by the Q electric power generators 302.

As a result of satisfaction of the Y distributed electric power demand by the electric power generator clusters 300, the energy storage units 306 may have no and/or nominal ES energy storage unit outputs and may retain A energy availability greater than or equal to the energy availability threshold. The first energy storage unit 306 and the second energy storage unit 306 may have no and/or nominal ES energy storage unit outputs. The controllers 314 may measure and/or interpret received signals of the A energy availability of the first energy storage unit 306 and the second energy storage unit 306 and compare the A energy availability to the energy availability threshold to determine that the first energy storage unit 306 and the second energy storage unit 306 retain A energy availability greater than or equal to the energy availability threshold.

Using the A energy availability of each of the energy storage units 306, the controllers 314 may determine and control and/or signal the sharing electric power demand for the electric power generators 302 of each electric power generator cluster 300 to be the same for all clusters 300 and to be equal to the Y distributed electric power demand. The controllers 314 may determine S sharing multiplication factors for each electric power output unit 304 using the respective A energy availability. Under normal operations of the electric power generator clusters 300, the S sharing multiplication factors may be such that, when used to generate sharing electric power demand, the resulting sharing electric power demand may be equal to the Y distributed electric power demand. The sharing electric power demand for the electric power generators 302 of the first electric power generator cluster 300 and the second electric power generator cluster 300 may be determined and controlled and/or signaled to be the same and to be equal to the Y distributed electric power demand.

The electric power output units 304 may be controlled and/or signaled by the controllers 314 to provide PO electric power outputs equal to the Y distributed electric power demand. The first electric power output unit 304 and the second electric power output unit 304 may be controlled and/or signaled to provide PO electric power outputs equal to the respective sharing electric power demands that may be equal to the Y distributed electric power demand. Under normal operation of the electric power generator clusters 300, the PO electric power outputs of the electric power output units 304 may be a combination of the PG electric power generator outputs of the respective electric power generators 302, equal to the sharing electric power demand, and the no and/or nominal ES energy storage unit outputs of the respective energy storage units 306.

For example, if the total load 308 demand X is 180 kW during normal mode of microgrid operation, then the Y distributed electric power demand on each of the two clusters 300 (e.g., cluster 1 and cluster M in a two cluster 300 microgrid) is 90 kW (i.e., 180/2). If PG Max of each generator 302 in both clusters 1 and M is 45 kW, and there are two generators in cluster 1 (i.e., N=2) and three generators in cluster M (i.e., Q=3), then the sharing electric power demand on the first cluster 300 (e.g., cluster 1) and its associated electric power output unit 304 (e.g., unit 1) 1 is 90 kW. Each generator 302 in the first cluster 1 outputs its PG Max 45 kW of power (i.e., 45 kW×2=90 kW) to satisfy the sharing electric power demand. Thus, the sharing electric power demand on the first cluster 1 equals to the Y distributed electric power demand. The S sharing multiplication factor on the first cluster 1 and the first power output unit 1 is 100% (i.e., equals to one). The value of A is 100% and the value of ES=0 for the first energy storage unit 1 associated with the first cluster 1 and the first power output unit 1.

Likewise, the sharing electric power demand on the second cluster 300 (e.g., cluster M) and its associated electric power output unit 304 (e.g., unit R) 1 is also 90 kW. Each generator 302 in the second cluster M outputs 30 kW of power (i.e., 30 kW×3=90 kW) to satisfy the sharing electric power demand of 90 kW. Thus, each generator 302 in the second cluster M outputs PG which is ⅔ of its PG Max of 45 kW. The sharing electric power demand on the second cluster M also equals to the Y distributed electric power demand. The S sharing multiplication factor on the second cluster M and the second power output unit R is also 100% (i.e., equals to one). The value of A is 100% and the value of ES=0 for the second energy storage unit V associated with the second cluster M and the second power output unit R.

FIG. 3B illustrates an example of the microgrid managing power demand distribution across the electric power generators 302 under a mix of normal and abnormal operation of the electric power generator clusters 300. The electric power output units 304 may be controlled to provide PO electric power outputs equal to a respective sharing electric power demand. The controllers 314 may determine the sharing electric power demand for the electric power generators 302 of each electric power generator cluster 300 to be equal to the Y distributed electric power demand and to the other sharing electric power demands for all electric power generator clusters 300 under normal operation. The controllers 314 may determine the sharing electric power demand for the electric power generators 302 of each electric power generator cluster 300 under abnormal operation to be a fraction of the Y distributed electric power demand.

The second electric power generator cluster 300 may operate under normal operation and be as described herein with reference to FIG. 3A. The first electric power generator cluster 300 may operate under abnormal operation. Under abnormal operation of one or more electric power generator clusters 300, the electric power generators 302 of an electric power generator cluster 300 may provide insufficient PG electric power generator output to satisfy the Y distributed electric power demand. As such, the PG MAX maximum electric power generation capacity of any of the electric power generators 302 may be less than the Y distributed electric power demand divided by the number of electric power generators 302 in the electric power generator cluster 300. The PG electric power generator output of any of the electric power generators 302 may be controlled and/or signaled by the controllers 314 to be the PG MAX maximum electric power generation capacity of each respective electric power generator 302. The PG electric power generator output of any of the electric power generators 302 of the first electric power generator cluster 300 may be the PG MAX maximum electric power generation capacity of each respective electric power generator 302.

As a result of not satisfying the Y distributed electric power demand by the first electric power generator cluster 300 of the microgrid, the first energy storage unit 306 may have ES energy storage unit outputs and may have A energy availability less than the energy availability threshold. The controllers 314 may measure and/or interpret received signals of the A energy availability of the first energy storage unit 306 and compare the A energy availability to the energy availability threshold to determine that the first energy storage unit 306 may have A energy availability less than the energy availability threshold.

Using the A energy availability of each of the energy storage units 306, the controllers 314 may determine and control and/or signal the sharing electric power demand for the electric power generators 302 of each electric power generator cluster 300. The controllers 314 may determine S sharing multiplication factors for each electric power output unit 304 using the respective A energy availability. Under abnormal operations of one or more electric power generator clusters 300, the sharing multiplication factors may be such that, when used to generate sharing electric power demand, the resulting sharing electric power demand may be less than the Y distributed electric power demand. Thus, in the specific example, the sharing electric power demand for the electric power generators 302 of the first electric power generator cluster 300 may be determined and controlled and/or signaled to be less than the Y distributed electric power demand.

The electric power output units 304 may be controlled and/or signaled by the controllers 314 to provide PO electric power outputs equal to the Y distributed electric power demand. The first electric power output unit 304 may be controlled and/or signaled to provide PO electric power output equal to the respective sharing electric power demand that may be less than the Y distributed electric power demand. Under abnormal operation of the electric power generator clusters 300, the PO electric power outputs of the electric power output units 304 may be a combination of the PG electric power generator outputs of the respective electric power generators 302, equal to the sharing electric power demand, and the ES energy storage unit outputs of the respective energy storage units 306. The first electric power output unit 304 may output the combination of the PG electric power generator output of the electric power generators 302 of the first electric power output unit 304, equal to the sharing electric power demand, and the ES energy storage unit output of the first energy storage unit 306.

The sharing electric power demand for an electric power output unit 304 under abnormal operation may be continually and/or repeatedly adjusted until the A energy availability of the associated energy storage unit 306 equalizes. The sharing electric power demand for an electric power output unit 304 under normal operation may also be continually and/or repeatedly adjusted until the A energy availabilities of the energy storage units 306 associated with the electric power output units 304 under abnormal operation equalize. The sharing power demand may be adjusted by changing the Y distributed electric power demand for all electric power output units 304 and the S sharing multiplication factors for the electric power output unit 304 under abnormal operation.

For example, the sharing electric power demand for the first electric power output unit 304 (e.g., electric power output unit 1) and the second electric power output unit 304 (e.g., electric power output unit R) may be adjusted until the A energy availability of the first energy storage unit 306 (e.g., energy storage unit 1) associated with the first electric power output unit 1 equalizes. More specifically, if the total load 308 demand X is 215 kW during abnormal mode of microgrid operation, then the Y distributed electric power demand on each of the two clusters 300 (e.g., cluster 1 and cluster M in a two cluster 300 microgrid) is 107.5 kW (i.e., 215/2). PG Max of each generator 302 in both clusters 1 and M is 45 kW, and there are two generators in cluster 1 (i.e., N=2) and three generators in cluster M (i.e., Q=3).

The sum of PG Max of all generators 302 in the first cluster 1 is 90 kW, which is less than the 107.5 kW Y distributed electric power demand. This causes power to be drawn from the first energy storage unit 1, which in turn causes the ES energy storage unit output to be greater than zero and the A energy availability to be less than 100%. This power draw from the first energy storage unit 1 triggers the controllers 314 to recalculate the S sharing multiplication factor to be less than 1 for the first output unit 1 and its associated first cluster 1. The power draw from the first energy storage unit 1 triggers the controllers 314 to recalculate the Y distributed electric power demand, increasing the Y distributed electric power demand to account for the deficiency of the first cluster 1 to supply the previous Y distributed electric power demand.

The sum of the PG Max of all generators 302 in the second cluster M is 135 kW, which is greater than the 107.5 kW Y distributed electric power demand. No power needs to be drawn from the second energy storage unit V. As such, for the second energy storage unit V, the ES energy storage unit output may be zero, or nominally above zero, and A to be at or about 100%. The S sharing multiplication factor for the second cluster M may be 100%. The controllers 314 may not be triggered to implement any further recalculation of the Y distributed electric power demand and the S sharing multiplication factor for the second cluster M based on these ES energy storage unit output and A energy availability values persist for the second energy storage unit V.

As the Y distributed electric power demand for both the first cluster 1 and the second cluster M and the S sharing multiplication factor for the first cluster 1 are recalculated, the controllers may repeatedly or continuously determine whether the first cluster 1 and the second cluster M meet their respective sharing electric power demands. Recalculating of the Y distributed electric power demand and/or the S sharing multiplication factors may continue until the A energy availability of the first energy storage unit 1 equalizes. At the point where the A energy availability of the first energy storage unit 1 equalizes the first cluster 1 and M second cluster may meet their respective sharing electric power demands, and power draw from the first energy storage unit 1 may not be needed.

Continuing with the example, recalculating the Y distributed electric power demand may finally result in the Y distributed electric power demand being set to 125 kW. Recalculating the S sharing power multiplication factor may finally result in the S sharing power multiplication factor being set to 72% (i.e., 0.72) for the first output unit 1 and its associated first cluster 1, such that the sharing electric power output equals to PG Max (i.e., 90 kW). In other words, when the Y distributed electric power demand (i.e., 125 kW) is multiplied by the S sharing power multiplication factor (i.e., 0.72), the sharing electric power output is 90 kW, which equals to PG Max for the first cluster 1 and its associated power output unit 1. However, the calculation of S may be set such that the sharing electric power output is set to a fixed predetermined value less than PG Max in an alternative embodiment.

In contrast, the Y distributed electric power demand (i.e., 125 kW) is less than the sum of PG Max (i.e., 45+45+45=135 kW) of all generators in the second cluster M. Therefore, the second cluster M and its associated electric power output unit R continue to operate in the normal mode because no power is drawn from their associated energy storage unit V and the A energy availability is at or about 100%. The sharing electric power demand on the second cluster M and its associated electric power output unit R is also 125 kW. Each generator 302 in the second cluster M outputs 41.6 kW of power (i.e., 41.6 kW×3=125 kW) to satisfy both its sharing and its Y distributed electric power demand of 125 kW. Thus, each generator 302 in the second cluster M outputs PG electric power generator output which is 92.4% of its PG Max electric power generator output of 45 kW. The sharing electric power demand on the second cluster M equals to the distributed electric power demand. The S sharing multiplication factor on the second cluster M and the second power output unit R is also 100% (i.e., equals to one). The value of A energy availability is 100% and the value of ES energy storage unit output=0 for the second energy storage unit V associated with the second cluster M and the second power output unit R.

Figure 4:
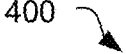
FIG. 4 is a graph diagram of an example sharing multiplication factor function according to some embodiments.
Figure 4:
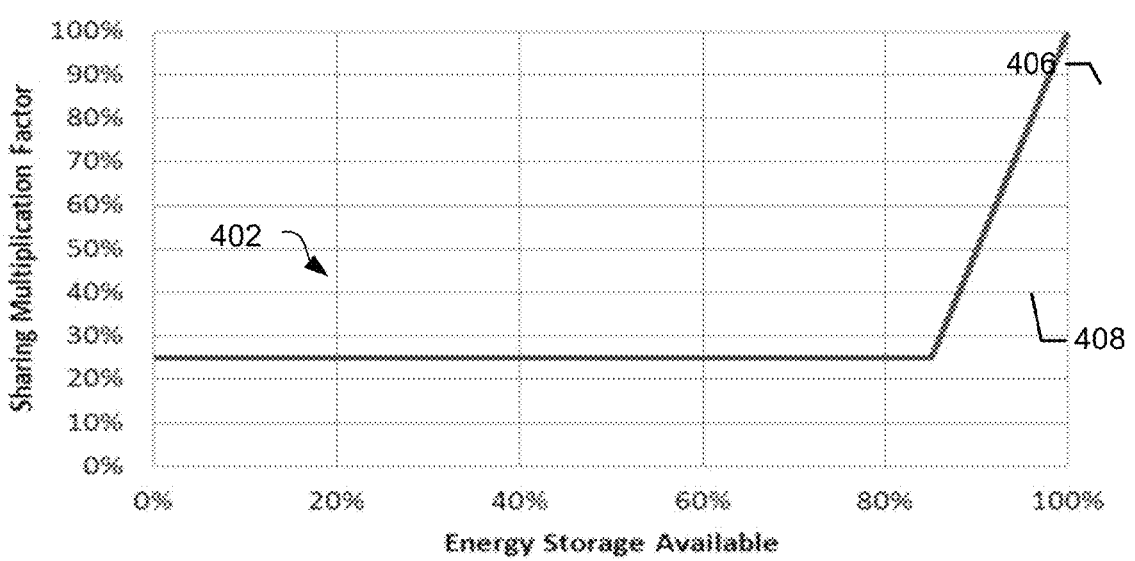

FIG. 4 illustrates an example sharing multiplication factor function according to some embodiments. A graph 400 illustrates the relationship of energy availability of an energy storage unit 306 ("Energy Storage Available" along the horizontal axis of the graph 400 in FIG. 4) and a sharing multiplication factor determined by the controllers 314 ("Sharing Multiplication Factor" along the vertical axis of the graph 400 in FIG. 4). A plot 402 may represent a sharing multiplication factor function plotted on the graph 400. In some embodiments, the plot 402 may represent the sharing multiplication factor function for electric power generators 302 of an electric power generator cluster 300 associated with an energy storage unit 306 and power output unit 304. In some embodiments, the sharing multiplication factor function may be implemented by the controllers 314.

In this example, the sharing multiplication factor function may plot a point 404 at which an energy availability of the energy storage unit 306 may be greater than or equal to an energy availability threshold, such as and/or approximately an energy storage capacity of the energy storage unit 306. In some embodiments, the energy availability threshold may be and/or may be approximately 100% of the energy storage capacity of the energy storage unit 306. In alternative embodiment, this threshold may be less than 100%, such as 20 to 90%. Further, at the point 404 the sharing multiplication factor may be configured to generate a sharing electric power demand equal to a distributed electric power demand for the electric power generators 302. For example, the sharing multiplication factor may be 100%, and the sharing electric power demand calculated using the distributed electric power demand and the sharing multiplication factor may be equal to the distributed electric power demand.

The remainder of the plot 402 may represent values of the energy availability of the energy storage unit 306 less than the energy availability threshold, which may indicate to the controllers 314 that the electric power generators 302 of a given cluster 300 may not be able to support the distributed electric power demand. As such, the controllers 314 may determine a sharing electric power demand for the electric power generators 302 that is less than the distributed electric power demand.

The sharing multiplication factor function may include a line 406 for which a decreasing energy availability of the energy storage unit 306 below the energy availability threshold may correlate with a decreasing sharing multiplication factor. Similarly, for the line 406 an increasing energy availability of the energy storage unit 306 below the energy availability threshold may correlate with an increasing sharing multiplication factor. While the energy availability of the energy storage unit 306 remains below the energy availability threshold, the sharing multiplication factor may be configured to generate the sharing electric power demand less than the distributed electric power demand for the electric power generators 302. As the energy availability of the energy storage unit 306 decreases and/or the distributed electric power demand for the electric power generators 302 increases, the sharing multiplication factor decrease. The sharing electric power demand calculated using the distributed electric power demand and the sharing multiplication factor may be less than the distributed electric power demand. For example, while the energy availability of the energy storage unit 306 is less than 100% and greater than 85%, the sharing multiplication factor may be less than 100% and greater than 25%. With regard to the example described above with respect to FIG. 3B, when the controller determines that the energy availability of the first energy storage unit 306 is, for example, 89.2%, the sharing multiplication factor for the first cluster 300 should be 72% based on the slope of line 406. Thus, the S sharing multiplication factor may be a dynamic variable for a range of values of energy availability based on the slope of line 406.

The sharing multiplication factor function may include a point 408 at which an energy availability of the energy storage unit 306 may be equalized. The energy availability of the energy storage unit 306 may equalize when the electric power generators 302 of the clusters 300 can satisfy their respective sharing electric power demands without need to draw electric power from the energy storage unit 306. For example, the point 408 at which the energy availability of the energy storage unit 306 may equalize may be and/or may be approximately 85% of the energy storage capacity of the energy storage unit 306. In some embodiments, at the point 408 the sharing multiplication factor may be a fixed value configured to generate a sharing electric power demand less than the distributed electric power demand for the electric power generators 302. For example, the sharing multiplication factor may be and/or may be approximately 25%, and the sharing electric power demand calculated using the distributed electric power demand and the sharing multiplication factor may be less than the distributed electric power demand.

The example illustrated in FIG. 4 is meant for the purposes of illustration and explanations and does not limit the scope of the claims and specification to the values of the example. It is conceived that the sharing multiplication factor function may be any function configured to relate the energy availability of the energy storage unit 306 below the energy availability threshold with a sharing multiplication factor such that the sharing electric power demand calculated using the distributed electric power demand and the sharing multiplication factor may be less than the distributed electric power demand. It is further conceived that the energy availability threshold, the equalization point of the energy availability of the energy storage unit 306, and/or the fixed sharing multiplication factor may be any value and may depend on variations in application and implementation.

Figure 5:
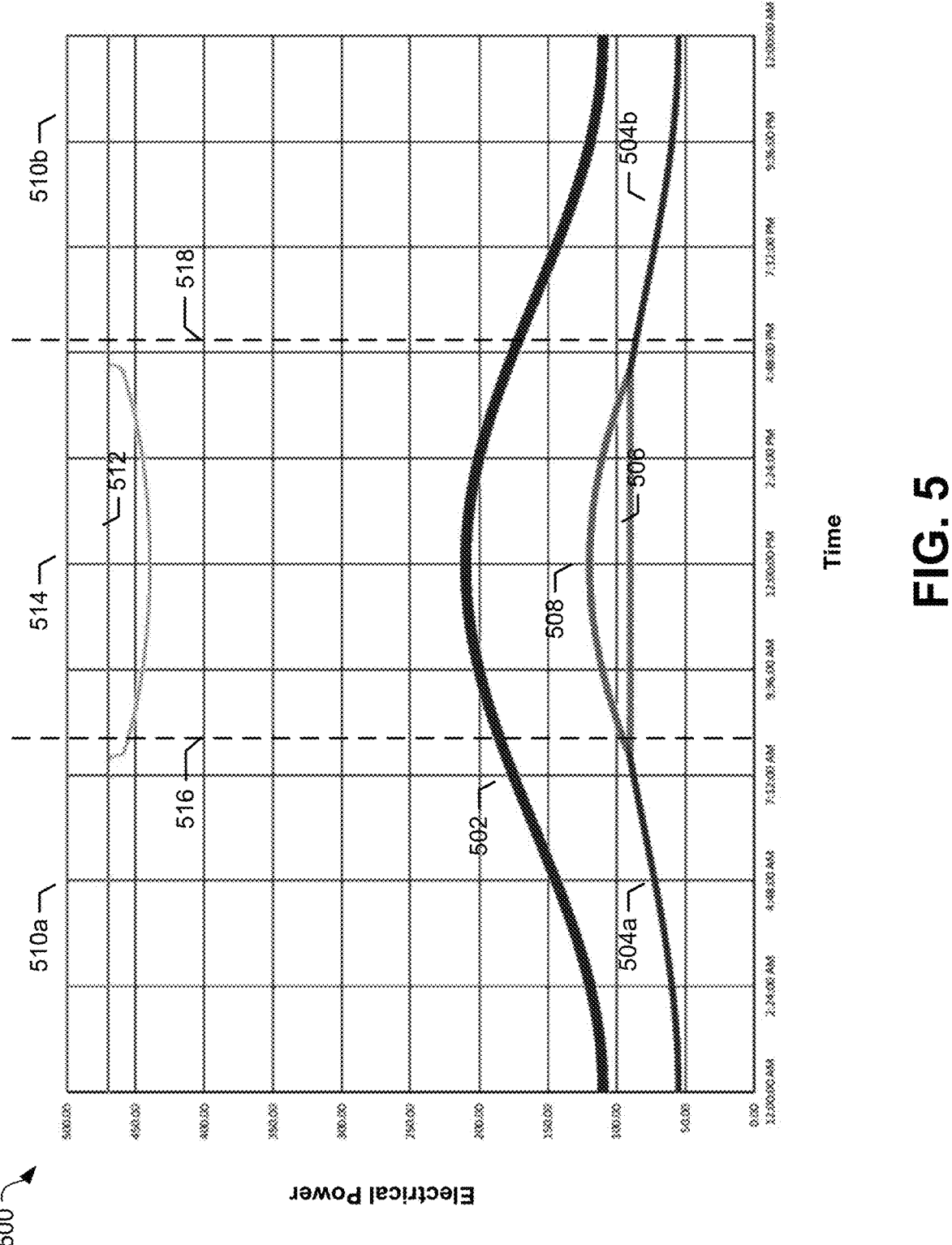
FIG. 5 is a graph diagram of electrical power versus time of an exemplary electrical power output of a microgrid managing electric power demand distribution across electric power generators according to some embodiments.

FIG. 5 illustrates a plot of electric power versus time for a microgrid managing electric power demand distribution across electric power generators 302 according to some embodiments. A graph 500 illustrates the electric power output for various electric power generators 302, the electric power availability of various energy storage units 306, and the electric power demand of an electrical load 308 ("Electric Power" along the vertical axis of the graph 500 in FIG. 5) over time ("Time" along the horizontal axis of the graph 500 in FIG. 5). The graph 500 illustrates an example of relationships between the electric power demands and outputs for the electric power generators 302 and the electric power availability of the related energy storage units 306 to meet the electric power demand of an electrical load 308. A plot 502 represents the total electric power demand of the electrical load 308. Plots 504a, 504b, and 506 represent the sharing electric power demand and corresponding electric power output for a first cluster 300 (e.g., cluster 1). Plots 504a, 504b, and 508 represent the sharing electric power demand and corresponding electric power output for a second cluster 300 (e.g., cluster M). Plots 510a, 510b, and 512 represent the electric power availability of a first energy storage unit 306 (e.g., unit 1). Plots 510a, 510b, and 514 represent the electric power availability of a second energy storage unit 306 (e.g., unit V). In some embodiments, the electric power demand 502, the sharing electric power demands and power outputs 504a, 504b, 506, 508, and/or the electric power availability 510a, 510b, 512, 514 may be as measured, interpreted, and/or determined by controllers 314.

In the example of FIG. 5, the load 308 may be a building which has a higher total electric power demand during the daytime than during the morning, evening or nighttime. First time 516 corresponds to beginning of daytime (e.g., 7:30 AM), while second time 518 corresponds to end of daytime (e.g., 4:30 PM). Prior to the first time 516 (i.e., during the night and morning), the electric power availability 510*a* of the first energy storage unit 1 and the second energy storage unit V may be greater than or equal to an energy availability threshold. In some embodiments the energy availability threshold may be and/or may be approximately an energy storage capacity of the individual energy storage units 306 (e.g., no power is drawn from the energy storage units 306 and the power generators 302 alone can satisfy the total power demand of the load 308). In the example illustrated in FIG. 5, the electric power availability 510*a* of the first energy storage unit 306 and the second energy storage unit 306 may be and/or may be approximately the same.

The first cluster 300 (e.g., cluster 1) of electric power generators 302 and the second cluster 300 (e.g., cluster M) of electric power generators 302 may each have respective sharing electrical power demands and equal power outputs (i.e., PO) represented by curve 504*a*. The sharing electric power demand 504*a* of the first cluster of electric power generators 302 and the second cluster of electric power generators 302 may be equal to a distributed electric power demand, which may be an equal portion of the total load electric power demand 502. The sharing electric power demand 504*a* may represent the sharing electric power demand for the first cluster of electric power generators 302 and the second cluster of electric power generators 302 under normal operation. The electric power demand 504*a* may be determined by the controllers 314 to be the distributed electric power demand without using the using a sharing multiplication factor. When using the sharing multiplication factor to determine electric power demand 504*a*, the controllers 314 may generate a shared electrical power demand equal to the distributed electric power demand using the sharing multiplication factor equal to 1.

Between the first time 516 and a second time 518 (e.g., during the daytime), the first cluster 300 of electric power generators 302 may operate under abnormal operation as its share of the electric power demand 502, equal to the distributed electric power demand, may exceed the electric power output capabilities of the first cluster 300 of electric power generators 302. The first cluster of electric power generators 302 may not be capable of meeting the distributed electric power demand (which may be the same as electric power demand 508) as the controllers 314 respond to the total electric power demand 502 of the load and the deficiency of the first cluster 300 of electric power generators 302 to meet the distributed electric power demand. The first energy storage unit 306 (e.g., unit 1) which is associated with the first cluster 300 (e.g., cluster 1) of electric power generators 302, may output electrical power to compensate for the deficiency between the distributed electric power demand and the electric power output capability of the first cluster 300 of electric power generators 302. As a result of outputting electrical power, the electric power availability 512 of the first energy storage unit 306 may be reduced to less than the energy availability threshold. The controllers 314 may determine a new sharing multiplication factor of less than one for the first cluster 300 of electric power generators 302, such that the sharing electric power demand is less than the distributed electric power demand 508.

During the same time period (e.g., daytime) between the first time 516 and a second time 518, the second cluster 300

(e.g., cluster M) of electric power generators 302 may operate under normal operation, and continue to provide electric power to satisfy the electric power demand 508, which may be equal to the distributed electric power demand. As the distributed electric power demand continues to be satisfied, the electric power availability 514 of the second energy storage unit 306 (e.g., unit V) associated with the second cluster of electric power generators 302, may remain equal to or greater than the energy availability threshold. The electric power demand and output 508 may be determined by the controllers 314 in a manner that allows the clusters 300 to satisfy the total electric power demand 502, with and/or without the aid of the energy storage units 306, using unequal sharing electric power demands for at least two clusters 300.

After the second time 518 (e.g., during evening and nighttime), the first cluster 300 of electric power generators 302 may return to operating under normal operation as its share of the electric power demand 502, equal to the distributed electric power demand, may no longer exceed the electric power output capability (i.e., sum of PG Max) of the first cluster 300 of electric power generators 302. The electric power availability 510*b* of the first energy storage unit 306 may again be greater than or equal to an energy availability threshold. The electric power availability 510*b* of second energy storage unit 306 may remain greater than or equal to an energy availability threshold.

The electric power demand and output 504*b* of the first cluster 300 of electric power generators 302 may return to being equal to the distributed electric power demand, and the electric power demand and output 504*b* of the second cluster of electric power generators 302 may remain equal to the distributed electric power demand. The electric power demand 504*b* may represent the electric power demand for the first cluster of electric power generators 302 and the second cluster of electric power generators 302 under normal operation. The electric power demand 504*b* may be determined by the controller 314 in a similar manner to the electric power demand 504*a*.

Figure 6:
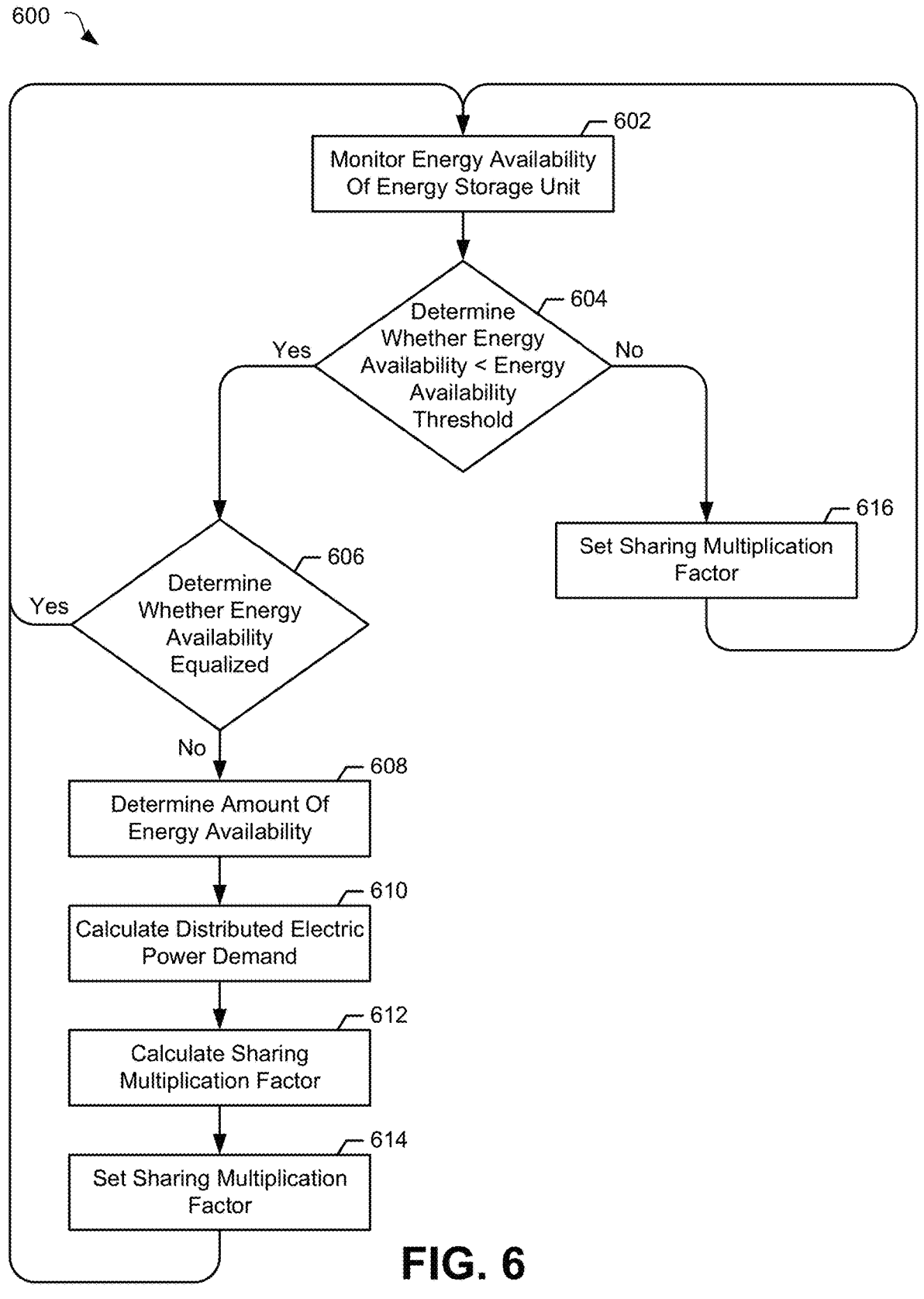
FIG. 6 is a process flow diagram for setting the sharing multiplication factor for each cluster of electric power generators in a microgrid according to some embodiments.

FIG. 6 illustrates a method 600 for setting the S sharing multiplication factor for each cluster 300 of electric power generators 302 in a microgrid according to various embodiments. The method 600 may be implemented using one or more controllers 314 configured to receive signals from and/or send control signals to any number and combination of electric power generators 302, electric power generator clusters 300, energy storage units 306, electric power output units 304, electric power generator busses 310, energy storage unit busses 312, and electrical load busses 316. In order to encompass the alternative configurations enabled in various embodiments, the hardware implementing the method 600 is referred to herein as a "control device."

In block 602, the control device may monitor energy availability of an energy storage unit 306. In some embodiments, the control device may determine the state of charge of a battery, capacitor or ultracapacitor energy storage unit 306 using any known state of charge determination method, such as open circuit voltage measurement, Coulomb counting, electrochemical impedance spectroscopy, etc. In some embodiments, the control device may directly measure and/or interpret received signals as the voltage and/or current available at the energy storage unit 306. In some embodiments, received signals may include electric power output by the energy storage unit 306. For example, the control device may directly measure and/or interpret received signals at and/or from the energy storage unit 306, an energy storage unit bus 312 and/or DC bus 310, and/or an electric power output units 304.

In determination block 604, the control device may determine whether the energy availability of the energy storage unit 306 is less than an energy availability threshold. In some embodiments, the control device may determine whether the energy availability of the energy storage unit 306 is less than an energy availability threshold based on state of charge and/or electric power output of the energy storage unit 306. In some embodiments, the control device may measure and/or interpret energy availability of the energy storage unit 306, as discussed further herein with reference to block 606, and compare it to the energy availability threshold. The control device may determine whether the energy availability of the energy storage unit 306 is less than an energy availability threshold from the comparison. In some embodiments, the energy availability threshold may be and/or may be approximately 100% of the energy storage capacity of the energy storage unit 306.

In response to determining that the energy availability of the energy storage unit 306 is less than an energy availability threshold (i.e., determination block 604="Yes"), the control device may determine whether the energy availability of the energy storage unit 306 is equalized in determination block 606. In some embodiments, the control device may determine that the energy availability of the energy storage unit 306 is equalized when the electric power generators 302 of clusters 300 output electric power sufficient to satisfy respective sharing electric power demands without drawing electric power from the energy storage unit 306. For example, the sharing electric power demand may be a portion of or all of a distributed electric power demand calculated by applying a sharing multiplication factor to the distributed electric power demand. The control device may compare a maximum electric power generation capacity and/or a measured electric power output of the clusters 300 to the respective sharing electric power demands. The energy availability of the energy storage unit 306 may be equalized when the maximum electric power generation capacity and/or the measured electric power output of the clusters 300 meet and/or exceed the respective sharing electric power demands. In some embodiments, the control device may determine that the energy availability of the energy storage unit 306 is equalized when the energy availability reaches a predetermined value.

In response to determining that the energy availability of the energy storage unit 306 is equalized (i.e., determination block 606="Yes"), the control device may monitor energy availability of an energy storage unit 306 in block 602.

In response to determining that the energy availability of the energy storage unit 306 is not equalized (i.e., determination block 606="No"), the control device may determine the amount of energy availability of the energy storage unit 306 in block 608. The control device may directly measure and/or interpret received signals as the voltage and/or current available at the energy storage unit 306. For example, the control device may determine the energy availability the energy storage unit 306 by electrochemical impedance spectroscopy (EIS) response, open circuit voltage state of charge determination, coulomb counting, etc. of a battery, a capacitor, a supercapacitor, etc. For another example, the control device may determine the energy availability the energy storage unit 306 as a velocity of a flywheel. For another example, the control device may determine the energy availability the energy storage unit 306 as filled volume of and/or a pressure in a liquid reservoir, a gas reservoir, etc. In some embodiments, the functions of block 608 may be implemented by the control device at other points in the method 600, such as prior to and/or as a part of determination block 604.

In block 610, the control device may calculate the distributed electrical power demand. As discussed herein, the distributed electric power demand may be an equal distribution (i.e., portion) of electric power needed to satisfy the electric power demand of the electrical load 308 for each electrical power output unit 304 and its associated electric power generator cluster 300 and/or energy storage unit 306. In some embodiments, the distributed electric power demand may be the electric power demand of the electrical load 308 divided by a number of electric power output units 304 and/or associated clusters 300, such as during normal operation of the electric power generator clusters 300. In some embodiments, the distributed electric power demand may be greater than the electric power demand of the electrical load 308 to account for deficiencies in providing electric power from at least one electric power output unit 304 and/or associated cluster 300, such as during abnormal operation of the electric power generator clusters 300. The control device may modify a previous distributed electric power demand value by increasing the distributed electric power to account for deficiencies in providing electric power from the electric power generator cluster 300.

In block 612, the control device may calculate a sharing multiplication factor for electric power generators 302 of the cluster 300 associated with the energy storage unit 306. The control device may execute a sharing multiplication factor function that may use the energy availability of the energy storage unit 306 to calculate the sharing multiplication factor. The sharing multiplication factor function may be any function configured to relate the energy availability of the energy storage unit 306 below the energy availability threshold with a sharing multiplication factor so that a sharing electric power demand for the electric power generators 302 calculated using the product of the distributed electric power demand and the sharing multiplication factor may be less than the distributed electric power demand.

In block 614, the control device may set the sharing multiplication factor for the electric power generators 302 of a cluster 300. The control device may use the sharing multiplication factor calculated in block 612 to set the sharing multiplication factor. In some embodiments, the control device may set the sharing multiplication factor for the electric power generators 302 at a respective electric power output unit 304. In some embodiments, the control device may set the sharing multiplication factor by storing a value representative of the sharing multiplication value in a memory, such as a cache, a buffer, a register, etc.

In response to determining that the energy availability of the energy storage unit 306 is not less than an energy availability threshold (i.e., determination block 604="No"), the control device may set the sharing multiplication factor for the electric power generators 302 of a cluster in block 616. In some embodiments, the control device may use a default sharing multiplication factor which equals to one so that a sharing electric power demand for the electric power generators 302 calculated using the product of the distributed electric power demand and the sharing multiplication factor is equal to the distributed electric power demand. In some embodiments, the control device may set the sharing multiplication factor for the electric power generators 302 at a respective electric power output unit 304. In some embodiments, the control device may set the sharing multiplication factor by storing a value representative of the sharing multiplication value in a memory, such as a cache, a buffer, a register, a flag bit, etc.

FIG. 7 illustrates a method 700 for managing electric power demand and output distribution across electric power generators in a microgrid according to various embodiments. The method 700 may be implemented using one or more controllers 314 configured to receive signals from and/or send control signals to any number and combination of electric power generators 302, electric power generator clusters 300, energy storage units 306, electric power output units 304, electric power generator busses 310, energy storage unit busses 312, and electrical load busses 316. In order to encompass the alternative configurations enabled in various embodiments, the hardware implementing the method 700 is referred to herein as a "control device."

In block 702, the control device may monitor an electric power demand of an electrical load 308. In some embodiments, the control device may directly measure and/or interpret received signals as the voltage and/or current of the electric power demand of the electrical load 308. In some embodiments, received signals may include reference signals on an electrical load bus 316 electrical connecting the microgrid to the electrical load 308.

In block 704, the control device may set a distributed electric power demand. As discussed herein, the distributed electric power demand may be an equal distribution (i.e., portion) of electric power needed to satisfy the electric power demand of the electrical load 308 for each electrical power output unit 304 and its associated electric power generator cluster 300 and/or energy storage unit 306. In some embodiments, the distributed electric power demand may be the electric power demand of the electrical load 308 divided by a number of electric power output units 304 and/or associated clusters 300, such as during normal operation of the electric power generator clusters 300. In some embodiments, the distributed electric power demand may be greater than the electric power demand of the electrical load 308 to account for deficiencies in providing electric power from at least one electric power output unit 304 and/or associated cluster 300, such as during abnormal operation of the electric power generator clusters 300. The control device may modify a previous distributed electric power demand value by increasing the distributed electric power to account for deficiencies in providing electric power from the electric power generator cluster 300. In some embodiments, the distributed electric power demand may be the distributed electric power demand calculated in block 610 of the method 600 described herein with reference to FIG. 6. In some embodiments, the control device may set the distributed electric power demand for each electric power generator cluster 300 at a respective electric power output unit 304. In some embodiments, the control device may set the distributed electric power demand by storing a value representative of the distributed electric power demand in a memory, such as a cache, a buffer, a register, etc.

In block 706, the control device may calculate a sharing electric power demand using the distributed electric power demand and a sharing multiplication factor. In some embodiments, the distributed electric power demand may be the distributed electric power demand set in block 704. In some embodiments, the sharing multiplication factor may be the sharing multiplication factors set in block 612 and/or in block 614 of the method 600 described herein with reference to FIG. 6. The control device may use the sharing multiplication factor and the distributed electric power demand in a sharing electric power demand function to calculate the sharing electric power demand. The sharing electric power demand function may use any number and combination of mathematical and/or logical operations to calculate the sharing electric power demand from the sharing multiplication factor and the distributed electric power demand. Under normal operation of the electric power generators 302, the sharing electric power demand may be the distributed electric power demand. Under abnormal operation of the electric power generators 302 the sharing electric power demand may be less than the distributed electric power demand.

In block 708, the control device may set the sharing electric power demand for the electric power generators 302 of a cluster 300. The control device may use the calculated sharing electric power demand, calculated in block 706, to set the sharing electric power demand for the electric power generators 302. In some embodiments, the control device may set the sharing electric power demand for the electric power generators 302 at a respective electric power output unit 304. In some embodiments, the control device may set the sharing electric power demand by storing a value representative of the sharing electric power demand in a memory, such as a cache, a buffer, a register, etc.

In block 710, the respective electric power output unit 304 may output a sharing electric power output from electrical power generators 302 to satisfy the sharing electric power demand. The electrical power generators 302 may generate sufficient electric power to satisfy the sharing electric power demand. The respective electric power output unit 304 may receive the electrical power generated by the electrical power generators 302. The respective electric power output unit 304 may output the electrical power received from the electrical power generators 302 to satisfy the sharing electric power demand.

In optional block 712, the respective electric power output unit 304 may output a difference of the distributed electric power demand and the sharing electrical power demand from a respective energy storage unit 306, to satisfy the distributed electric power demand for the electrical power generators 302. The respective energy storage unit 306 may output sufficient electric power to satisfy the difference between the distributed electric power demand and the sharing electric power demand. The respective electric power output unit 304 may receive the electrical power output by the respective energy storage unit 306. The respective electric power output unit 304 may output the electrical power received from the respective energy storage unit 306 along with the sharing electric power output from electrical power generators 302 to satisfy the distributed electric power demand. In some embodiments, optional block 712 may be implemented for the electric power generators 302 of the cluster 300 under abnormal operation, for which the maximum electric power generation capacity is less than the distributed electrical power demand.

In some embodiments, the methods 600, 700 may be implemented in series and/or in parallel. The methods 600, 700 may be periodically, repetitively, and/or continuously implemented.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements, including the control device 314 as well as connected controllers described herein, may be implemented using computing devices (such as computer) that include programmable processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a control device that may be or include a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use any of the described embodiments. Various modifications to these embodiments will be readily apparent to those skilled in the art, and the generic principles defined herein may be applied to other embodiments without departing from the scope of the disclosure. Thus, the claims are not intended to be limited to the embodiments shown herein but are to be accorded the widest scope consistent with the claim language and the principles and novel features disclosed herein.

What is claimed is:

1. A microgrid electrically connectable to a load, comprising:

two or more electric power generator clusters, each having at least one electric power generator, including a first electric power generator cluster having at least a first electric power generator;

two or more electric power output units, each electrically connected to a respective one of the two or more electric power generator clusters, including a first electric power output unit electrically connected to the first electric power generator cluster;

an energy storage unit electrically connected to the first electric power output unit; and a control device configured with control device executable code configured to cause the control device to execute operations comprising:

determining whether an energy availability of the energy storage unit is less than an energy availability threshold;

calculating a first sharing multiplication factor for the first electric power generator cluster in response to determining that the energy availability of the energy storage unit is less than the energy availability threshold;

calculating a sharing electric power demand for the first electric power generator cluster using the first sharing multiplication factor, wherein the sharing electric power demand is less that a distributed electric power demand; and setting the distributed electric power demand for the first electric power generator cluster such that:

the first electric power output unit outputs an amount of electric power received from the energy storage unit that is the difference between the distributed electric power demand and the sharing electric power demand in response to determining that the energy availability of the energy storage unit is less than an energy availability threshold, and the first electric power output unit outputs an amount of electric power received from the first electric power generator cluster satisfying the distributed electric power demand in response to determining that the energy availability of the energy storage unit is not less than an energy availability threshold.

2. The microgrid of claim 1, wherein the control device is configured with control device executable code configured to cause the control device to execute operations further comprising setting the sharing electric power demand for the first electric power generator cluster such that the first electric power output unit outputs an amount of electric power received from the first electric power generator cluster satisfying the sharing electric power demand.

3. The microgrid of claim 1, wherein the control device is configured with control device executable code configured to cause the control device to execute operations further comprising:

using a redundant electric power generator to continue supplying electric power is response to reduced electrical output from at least one electric power generator.

4. The microgrid of claim 1, wherein the control device is configured with control device executable code configured to cause the control device to execute operations such that setting the distributed electric power demand for the first electric power generator cluster comprises setting the distributed electric power demand to an amount divided equally by a number of the electric power output units.

5. The microgrid of claim 1, wherein the control device is configured with control device executable code configured to cause the control device to execute operations such that calculating the first sharing multiplication factor for the first electric power generator cluster comprises:
  determining an amount of the energy availability of the energy storage unit; and
  calculating the first sharing multiplication factor for the first electric power generator cluster using the amount of the energy availability of the energy storage unit.

6. The microgrid of claim 1, wherein the control device is configured with control device executable code configured to cause the control device to execute operations further comprising determining whether the energy availability of the energy storage unit is equalized,
  wherein calculating the first sharing multiplication factor for the first electric power generator cluster in response to determining that the energy availability of the energy storage unit is less than the energy availability threshold further comprises calculating the first sharing multiplication factor for the first electric power generator cluster in response to determining that the energy availability of the energy storage unit is not equalized.

7. The electric power generator microgrid of claim 1, wherein the energy storage unit comprises at least one of an electrical energy storage unit, mechanical energy storage unit, an electromechanical energy storage unit, an electrochemical energy storage unit, or a thermal energy storage unit.

8. The microgrid of claim 7, wherein:
  the first electric power generator comprises a fuel cell power generator;
  each of the at least two output units contains an inverter;
  the energy storage unit comprises at least one of a battery, capacitor or supercapacitor; and
  the control device is configured with control device executable code configured to cause the control device to execute operations such that determining the energy availability of the energy storage unit comprises determining a state of charge of the at least one of the battery, capacitor or supercapacitor.

9. The electric power generator microgrid of claim 1, wherein the first electric power generator comprises at least one of a fuel cell power generator, a combustion generator, a photovoltaic cell, a concentrated solar system, a wind turbine, a geothermal turbine, a hydroelectric turbine, a gas turbine, a nuclear reactor, an alternator, or an induction generator.

10. A method of managing electric power demand distribution across electric power generators in a microgrid electrically connected to a load, the method comprising:
  determining whether an energy availability of an energy storage unit is less than an energy availability threshold, wherein the energy storage unit is electrically connected to a first electric power output unit of a plurality of electric power output units;

calculating a first sharing multiplication factor for a first electric power generator cluster of a plurality of electric power generator clusters in response to determining that the energy availability of the energy storage unit is less than an energy availability threshold, wherein the first electric power generator cluster includes at least a first electric power generator that is electrically connected to the first electric power output unit;
calculating a sharing electric power demand for the first electric power generator cluster using the first sharing multiplication factor, wherein the sharing electric power demand is less that a distributed electric power demand; and
setting the distributed electric power demand for the first electric power generator cluster such that:
  the first electric power output unit outputs an amount of electric power received from the energy storage unit that is the difference between the distributed electric power demand and the sharing electric power demand in response to determining that the energy availability of the energy storage unit is less than an energy availability threshold, and
  the first electric power output unit outputs an amount of electric power received from the first electric power generator cluster satisfying the distributed electric power demand in response to determining that the energy availability of the energy storage unit is not less than an energy availability threshold.

11. The method of claim 10, further comprising setting the sharing electric power demand for the first electric power generator cluster such that the first electric power output unit outputs an amount of electric power received from the first electric power generator cluster satisfying the sharing electric power demand.

12. The method of claim 10, further comprising:
  using a redundant electric power generator to continue supplying electric power in response to reduced electrical output from at least one electric power generator.

13. The method of claim 10, wherein setting the distributed electric power demand for the first electric power generator comprises setting the distributed electric power demand to an amount divided equally by a number of the electric power output units.

14. The method of claim 10, wherein calculating a first sharing multiplication factor for the first electric power generator cluster comprises:
  determining an amount of the energy availability of the energy storage unit; and
  calculating the first sharing multiplication factor for the first electric power generator cluster using the amount of the energy availability of the energy storage unit.

15. The method of claim 14, wherein:
  the power generators comprise fuel cell power generators;
  the energy storage unit comprises at least one of a battery, capacitor or supercapacitor; and
  determining the amount of the energy availability of the energy storage unit comprises determining a state of charge of the at least one of the battery, capacitor or supercapacitor.

16. The method of claim 10, further comprising determining whether the energy availability of the energy storage unit is equalized,
  wherein calculating the first sharing multiplication factor for the first electric power generator cluster in response to determining that the energy availability of the energy storage unit is less than the energy availability threshold further comprises calculating the first sharing multiplication factor for the first electric power generator cluster in response to determining that the energy availability of the energy storage unit is not equalized.

17. A microgrid electrically connectable to a load, comprising:

two or more electric power generator clusters each having at least one fuel cell electric power generator, including a first electric power generator cluster having at least a first fuel cell power generator;

two or more electric power output units, each containing an inverter electrically connected to respective one of the two or more electric power generator clusters, including a first electric power output unit electrically connected to the first electric power generator cluster;

a battery electrically connected to the first electric power output unit; and a control device configured with control device executable code configured to cause the control device to execute operations comprising:

determining whether an energy availability of the battery is less than an energy availability threshold;

calculating a first sharing multiplication factor for the first electric power generator cluster in response to determining that the energy availability of the battery is less than the energy availability threshold;

calculating a sharing electric power demand for the first electric power generator cluster using the first sharing multiplication factor, wherein the sharing electric power demand is less that a distributed electric power demand;

configuring the first electric power output unit to output an amount of electric power received from the first electric power generator cluster satisfying the sharing electric power demand;

configuring the first electric power output unit to output an amount of electric power received from the battery that is the difference between the distributed electric power demand and the sharing electric power demand in response to determining that the energy availability of the energy storage unit is less than an energy availability threshold; and configuring the first electric power output unit to output an amount of electric power received from the first electric power generator cluster satisfying the distributed electric power demand in response to determining that the energy availability of the battery is not less than the energy availability threshold.

18. The microgrid of claim 17, wherein the control device is configured with control device executable code configured to cause the control device to execute operations such that configuring the first electric power output unit to output an amount of electric power received from the first electric power generator cluster satisfying the sharing electric power demand comprises setting the sharing electric power demand for the first electric power generator cluster.

19. The microgrid of claim 17, wherein the control device is configured with control device executable code configured to cause the control device to execute operations such that calculating the first sharing multiplication factor for the first electric power generator cluster comprises:

determining an amount of the energy availability of the energy storage unit; and calculating the first sharing multiplication factor for the first electric power generator cluster using the amount of the energy availability of the energy storage unit.

20. The microgrid of claim 19, wherein the control device is configured with control device executable code configured to cause the control device to execute operations further comprising determining whether the energy availability of the battery is equalized, wherein calculating the first sharing multiplication factor for the first electric power generator cluster in response to determining that the energy availability of the battery is less than the energy availability threshold further comprises calculating the first sharing multiplication factor for the first electric power generator cluster in response to determining the energy availability of the battery is not equalized.

* * * * *